United States Patent
Holtcamp et al.

(10) Patent No.: US 10,351,647 B2
(45) Date of Patent: Jul. 16, 2019

(54) POLYMERIZATION PROCESS USING BRIDGED METALLOCENE COMPOUNDS SUPPORTED ON ORGANOALUMINUM TREATED LAYERED SILICATE SUPPORTS

(71) Applicant: ExxonMobil Chemical Patents Inc., Baytown, TX (US)

(72) Inventors: Matthew W. Holtcamp, Huffman, TX (US); Gregory S. Day, College Station, TX (US); Laughlin G. McCullough, League City, TX (US); David F. Sanders, Beaumont, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 114 days.

(21) Appl. No.: 15/558,067

(22) PCT Filed: Apr. 15, 2016

(86) PCT No.: PCT/US2016/027725
§ 371 (c)(1),
(2) Date: Sep. 13, 2017

(87) PCT Pub. No.: WO2016/195824
PCT Pub. Date: Dec. 8, 2016

(65) Prior Publication Data
US 2018/0298127 A1 Oct. 18, 2018

Related U.S. Application Data

(60) Provisional application No. 62/168,302, filed on May 29, 2015.

(30) Foreign Application Priority Data

Jul. 16, 2015 (EP) .................................... 15177100

(51) Int. Cl.
*C08F 4/76* (2006.01)
*C08F 210/16* (2006.01)
*C08F 4/64* (2006.01)
*C08F 4/60* (2006.01)
*C08F 4/659* (2006.01)
*C08L 23/06* (2006.01)
*C08F 4/6592* (2006.01)
*C08F 10/00* (2006.01)
*C08F 210/06* (2006.01)
*C08F 210/14* (2006.01)

(52) U.S. Cl.
CPC ........ *C08F 210/16* (2013.01); *C08F 4/65912* (2013.01); *C08F 4/65916* (2013.01); *C08F 4/65927* (2013.01); *C08F 10/00* (2013.01); C08F 210/06 (2013.01); C08F 210/14 (2013.01); C08F 2500/03 (2013.01); C08F 2500/05 (2013.01); C08F 2500/12 (2013.01)

(58) Field of Classification Search
CPC ........ C08F 4/64148; C08F 4/64; C08F 10/02; C08F 4/64189; C08F 4/60189; C08F 4/659; C08F 4/65912; C08L 23/06
See application file for complete search history.

(56) References Cited

U.S. PATENT DOCUMENTS

| | | | |
|---|---|---|---|
| 5,308,811 A | 5/1994 | Suga et al. | |
| 5,928,982 A | 7/1999 | Suga et al. | |
| 5,973,084 A | 10/1999 | Suga et al. | |
| 6,040,261 A | 3/2000 | Hlatky | |
| 6,048,817 A | 4/2000 | Sagae et al. | |
| 6,147,173 A | 11/2000 | Holtcamp | |
| 6,211,105 B1 | 4/2001 | Holtcamp | |
| 6,239,062 B1 | 5/2001 | Cribbs | |
| 6,353,063 B1 | 3/2002 | Shimizu et al. | |
| 6,376,416 B1 | 4/2002 | Hirakawa et al. | |
| 6,376,629 B2 | 4/2002 | Nagy et al. | |
| 6,395,846 B1 | 5/2002 | Sato et al. | |
| 6,414,162 B1 | 7/2002 | Nagy | |
| 6,451,724 B1 | 9/2002 | Nifant'ev et al. | |
| 6,489,480 B2 | 12/2002 | Rodriguez | |
| 6,531,552 B2 | 3/2003 | Nakano et al. | |
| 6,703,338 B2 | 3/2004 | Holtcamp et al. | |
| 6,841,501 B2 | 1/2005 | Resconi et al. | |
| 6,858,689 B2 | 2/2005 | Holtcamp et al. | |
| 6,869,903 B2 | 3/2005 | Matsunaga | |
| 6,884,748 B2 | 4/2005 | McCullough | |
| 6,894,131 B2 | 5/2005 | McCullough et al. | |

(Continued)

FOREIGN PATENT DOCUMENTS

EP 0511665 7/1998
EP 1160261 6/2007

(Continued)

OTHER PUBLICATIONS

Villasenor, E. et al., "Neutral Dimethylzirconocene Complexes as Initiators for the Ring-Opening Polymerization of [epsilon]-Caprolactone", EP Journal of Inorganic Chemistry, vol. 2013, No. 7, pp. 1184-1196, Mar. 2013.

(Continued)

Primary Examiner — Robert D. Harlan

(57) ABSTRACT

This invention relates to a process to polymerize olefins by contacting one or more olefins with a catalyst system comprising an organoaluminum treated layered silicate support, and a bridged metallocene compound and obtaining a polyolefin having a g'vis of 0.90 or more and an MIR of 30 or less.

30 Claims, 11 Drawing Sheets

(56) References Cited

U.S. PATENT DOCUMENTS

| | | | |
|---|---|---|---|
| 7,115,694 | B2 | 10/2006 | Shimizu et al. |
| 7,220,695 | B2 | 5/2007 | Casty et al. |
| 7,838,611 | B2 | 11/2010 | Yamada et al. |
| 8,637,616 | B2 | 1/2014 | Buck et al. |
| 9,068,033 | B2 | 6/2015 | Fiscus et al. |
| 9,637,297 | B2 | 5/2017 | Oosterhuis et al. |
| 9,982,067 | B2* | 5/2018 | Holtcamp ............... C08F 10/02 |
| 9,994,657 | B2* | 6/2018 | Atienza ................ C08F 210/16 |
| 9,994,658 | B2* | 6/2018 | Atienza ............... C08F 4/64189 |
| 2002/0038036 | A1 | 3/2002 | Resconi et al. |
| 2003/0027950 | A1 | 2/2003 | Uchino et al. |
| 2003/0104928 | A1 | 6/2003 | Holtcamp |
| 2003/0171211 | A1 | 9/2003 | Holtcamp |
| 2004/0127348 | A1 | 7/2004 | Holtcamp et al. |
| 2004/0162403 | A1* | 8/2004 | Shimizu ................ C08F 10/06 526/160 |
| 2004/0236045 | A1 | 11/2004 | Matsunaga |
| 2005/0075242 | A1 | 4/2005 | Holtcamp et al. |
| 2005/0165183 | A1 | 7/2005 | McCullough et al. |
| 2005/0182210 | A1 | 8/2005 | Muruganandam et al. |
| 2012/0088890 | A1* | 4/2012 | Buck .................. C08F 4/65908 526/64 |

FOREIGN PATENT DOCUMENTS

| | | | |
|---|---|---|---|
| JP | 2007169341 | A | 7/2007 |
| JP | 200805278 | A | 3/2008 |
| JP | 5387325 | | 1/2014 |
| JP | 5487089 | | 5/2014 |
| WO | 01/42320 | | 6/2001 |
| WO | 2014/099303 | | 6/2014 |
| WO | 2014/099307 | | 6/2014 |
| WO | WO 2014099303 | * | 6/2014 |

OTHER PUBLICATIONS

Yoon, S. et al., "Synthesis, structure, and catalytic properties of ansa-Zirconocenes, Me2X(Cp) (Rind) ZrC12 (X=C, Si; R=2-p- or 3-p-tolyl)", Journal of Organometallic Chemistry, vol. 534, No. 1-2, pp. 81-87, Apr. 1997.

Karttunen, V. et al., "The influence of the ligand structure on activation of hafnocene polymerization catalysts: A theoretical study", Journal of Organometallic Chemistry, vol. 693, No. 1, pp. 155-163, Nov. 2007.

* cited by examiner

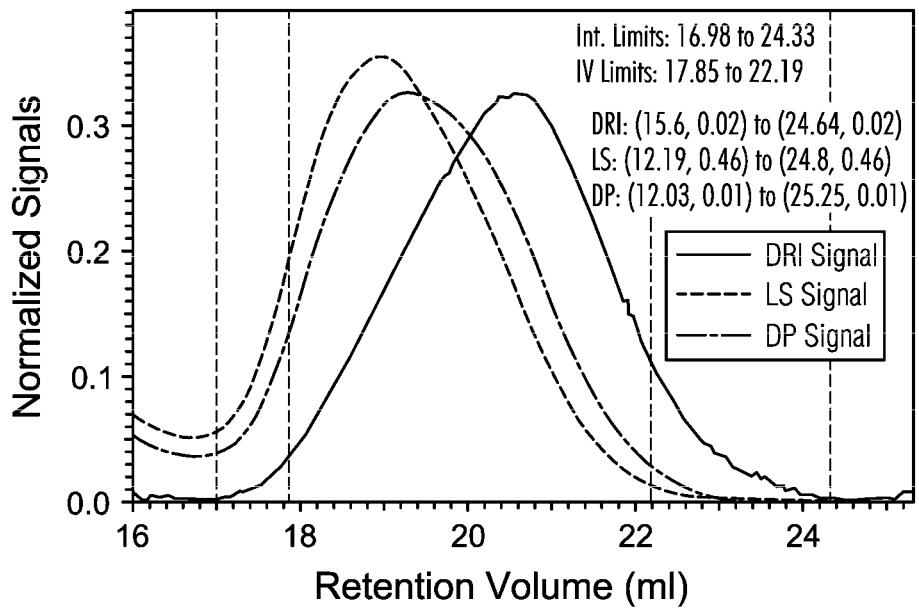

Normalized, DRI, LS & Viscometer Chromatograms

Int. Limits: 16.98 to 24.33
IV Limits: 17.85 to 22.19
DRI: (15.6, 0.02) to (24.64, 0.02)
LS: (12.19, 0.46) to (24.8, 0.46)
DP: (12.03, 0.01) to (25.25, 0.01)

— DRI Signal
---- LS Signal
—·— DP Signal

Run Conditions and Instrument & Polymer Parameters

Analyzed as ethylene-hexene copolymer with 6 weight percent comonomer

Inject Mass (mg) = 0.2381
Calc. Mass (mg) = 0.218 (91.5%)
Adjusted Flow Rate (ml/m) = 0.55
Column Cal. C0 = 12.888
Column Cal. C1 = -0.34584
Column Cal. C2 = -0.0014588
Column Cal. C3 = 0
Inject Mark (ml) = 32.369
Vistalon B1 = 0.983

Linear Zimm Analysis
A2 (Input Value) = 0.0015
(dn/dc) = 0.1048
LS to DRI (ml) = 0.223
LS to Vis. (ml) = 0.452
K (sample) = 0.00055295
alpha (sample) = 0.695
LS Calib. Const. = 4.3641e-05
DRI Const. = 0.0005045
DP Const. = 0.3171
IP Gain = 28.1 mV/KPa

FIG. 2B

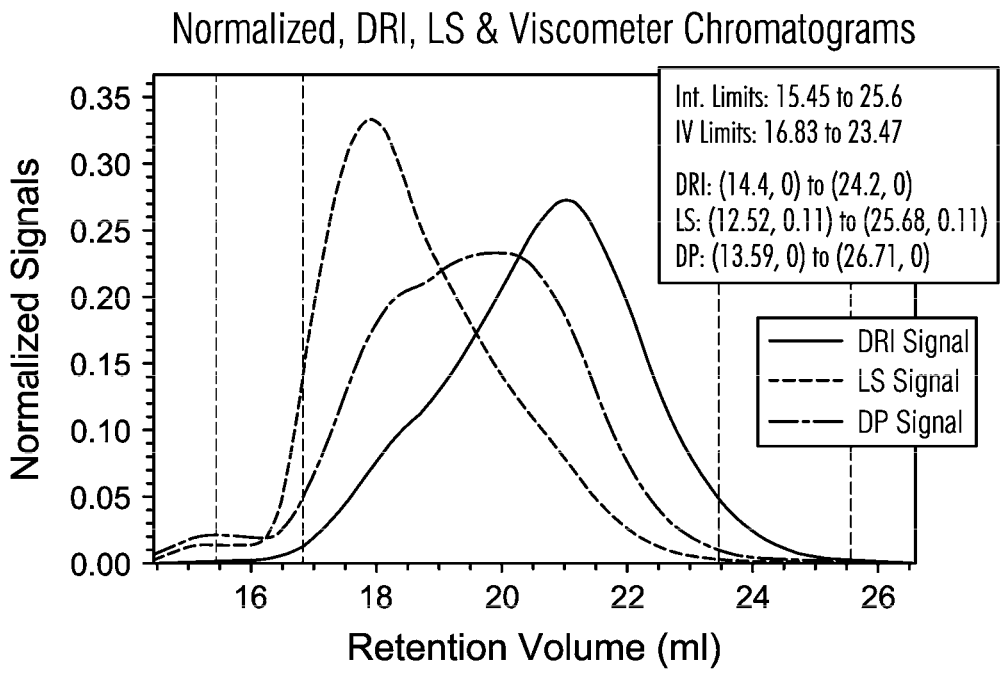

Normalized, DRI, LS & Viscometer Chromatograms

Int. Limits: 15.45 to 25.6
IV Limits: 16.83 to 23.47
DRI: (14.4, 0) to (24.2, 0)
LS: (12.52, 0.11) to (25.68, 0.11)
DP: (13.59, 0) to (26.71, 0)

— DRI Signal
----- LS Signal
-·-·- DP Signal

Run Conditions and Instrument & Polymer Parameters

Analyzed as ethylene-hexene copolymer with 6 weight percent comonomer

Inject Mass (mg) = 0.4566
Calc. Mass (mg) = 0.456 (99.8%)
Adjusted Flow Rate (ml/m) = 0.559
Column Cal. C0 = 11.501
Column Cal. C1 = -0.25721
Column Cal. C2 = -0.0022208
Column Cal. C3 = 0
Inject Mark (ml) = 33.278
Vistalon B1 = 0.536

Linear Zimm Analysis
A2 (Input Value) = 0.0015
(dn/dc) = 0.1048
LS to DRI (ml) = 0.2
LS to Vis. (ml) = 0.396
K (sample) = 0.00055295
alpha (sample) = 0.695
LS Calib. Const. = 0.00023914
DRI Const. = 0.0002237
DP Const. = 0.6311
IP Gain = 22.44 mV/KPa

FIG. 3B

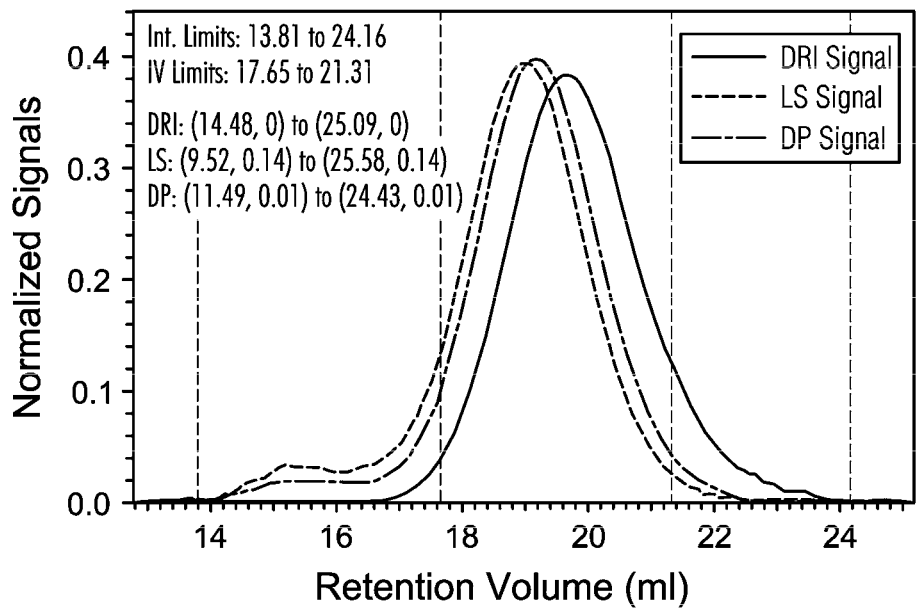

Normalized, DRI, LS & Viscometer Chromatograms

Run Conditions and Instrument & Polymer Parameters

Analyzed as ethylene-hexene copolymer with 1.74 weight percent comonomer

Inject Mass (mg) = 0.1439
Calc. Mass (mg) = 0.142 (98.6%)
Adjusted Flow Rate (ml/m) = 0.551
Column Cal. C0 = 11.872
Column Cal. C1 = -0.2975
Column Cal. C2 = -0.0016752
Column Cal. C3 = 0
Inject Mark (ml) = 32.386
Vistalon B1 = 1.019

Linear Zimm Analysis
A2 (Input Value) = 0.0015
(dn/dc) = 0.1048
LS to DRI (ml) = 0.25
LS to Vis. (ml) = 0.475
K (sample) = 0.00057144
alpha (sample) = 0.695
LS Calib. Const. = 4.7368e-05
DRI Const. = 0.000119
DP Const. = 0.3276
IP Gain = 27.79 mV/KPa

FIG. 4B

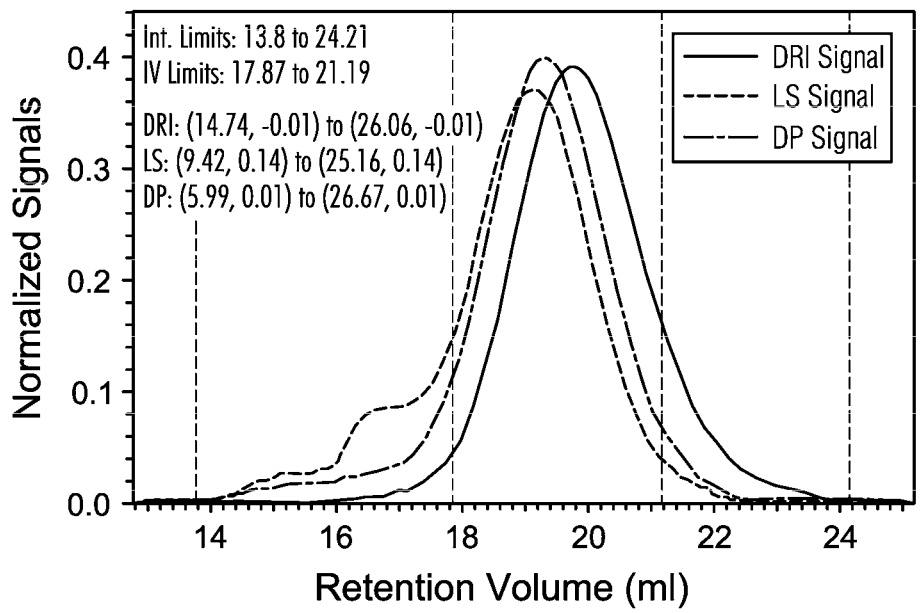

Normalized, DRI, LS & Viscometer Chromatograms

Run Conditions and Instrument & Polymer Parameters

Analyzed as ethylene-hexene copolymer with 2 weight percent comonomer

Inject Mass (mg) = 0.1498
Calc. Mass (mg) = 0.143 (95.4%)
Adjusted Flow Rate (ml/m) = 0.551
Column Cal. C0 = 11.872
Column Cal. C1 = -0.2975
Column Cal. C2 = -0.0016752
Column Cal. C3 = 0
Inject Mark (ml) = 32.386
Vistalon B1 = 0.965

Linear Zimm Analysis
A2 (Input Value) = 0.0015
(dn/dc) = 0.1048
LS to DRI (ml) = 0.25
LS to Vis. (ml) = 0.475
K (sample) = 0.00057031
alpha (sample) = 0.695
LS Calib. Const. = 4.7368e-05
DRI Const. = 0.000119
DP Const. = 0.3276
IP Gain = 27.79 mV/KPa

FIG. 5B

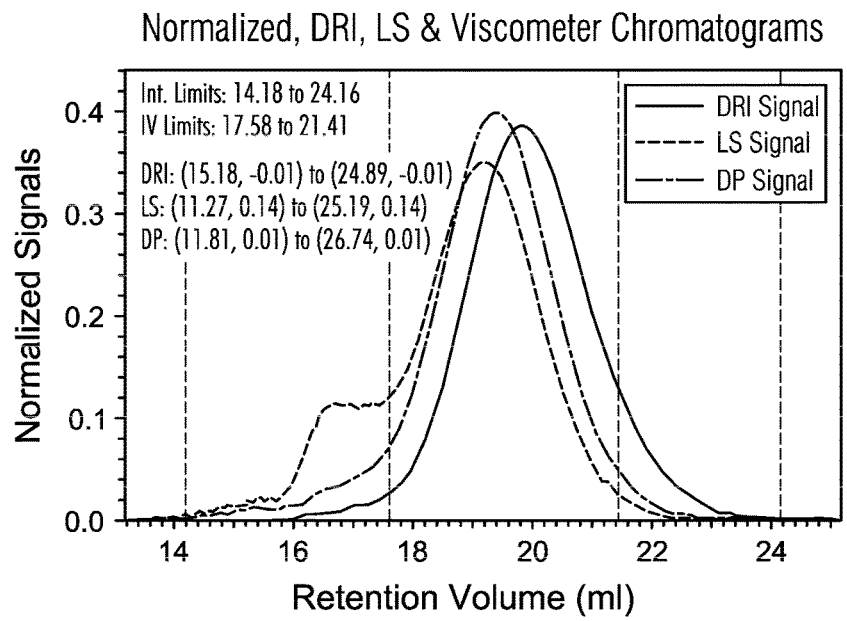

Run Conditions and Instrument & Polymer Parameters

Analyzed as ethylene-hexene copolymer with 2.88 weight percent comonomer

| | |
|---|---|
| Inject Mass (mg) = 0.1468 | Linear Zimm Analysis |
| Calc. Mass (mg) = 0.147 (99.9%) | A2 (Input Value) = 0.0015 |
| Adjusted Flow Rate (ml/m) = 0.551 | (dn/dc) = 0.1048 |
| Column Cal. C0 = 11.872 | LS to DRI (ml) = 0.25 |
| Column Cal. C1 = -0.2975 | LS to Vis. (ml) = 0.475 |
| Column Cal. C2 = -0.0016752 | K (sample) = 0.00056649 |
| Column Cal. C3 = 0 | alpha (sample) = 0.695 |
| Inject Mark (ml) = 32.386 | LS Calib. Const. = 4.7368e-05 |
| Vistalon B1 = 0.869 | DRI Const. = 0.000119 |
| | DP Const. = 0.3276 |
| | IP Gain = 27.79 mV/KPa |

FIG. 6B

POLYMERIZATION PROCESS USING BRIDGED METALLOCENE COMPOUNDS SUPPORTED ON ORGANOALUMINUM TREATED LAYERED SILICATE SUPPORTS

CROSS REFERENCE TO RELATED APPLICATIONS

This application is a national stage application of International Application No. PCT/US2016/027725, filed Apr. 15, 2016, that claims the benefit of Ser. No. 62/168,302, filed May 29, 2015, and European Application No. 15177100.3, filed Jul. 16, 2015, the disclosures of which are incorporated by reference in their entireties.

FIELD OF THE INVENTION

This invention relates to supported bridged metallocene compounds useful for the polymerization of olefins, in particular, ethylene. This invention also relates to polymerization processes using these supported bridged metallocene compounds, in particular, gas phase polymerization processes.

BACKGROUND OF THE INVENTION

Various types of polyethylenes are known in the art and low density polyethylene is one of the most useful. Low density polyethylene is generally prepared at high pressure using free radical initiators, or in gas phase processes using Ziegler-Natta or vanadium catalysts, and typically has a density in the range of 0.915 to 0.950 g/cm$^3$. Typical low density polyethylene produced using free radical initiators is known in the industry as "LDPE". LDPE is also known as "branched" or "heterogeneously branched" polyethylene because of the relatively large number of long chain branches extending from the main polymer backbone. Polyethylene in the same density range, i.e., 0.915 to 0.940 g/cm$^3$, which is linear and does not contain long chain branching is known as "linear low density polyethylene" ("LLDPE") and is typically produced with conventional Ziegler-Natta catalysts or with metallocene catalysts. Polyethylenes having still greater density are the high density polyethylenes ("HDPEs"), i.e., polyethylenes having densities greater than 0.940 g/cm$^3$, and are generally prepared with Ziegler-Natta catalysts. Very low density polyethylenes ("VLDPEs") are also known. VLDPEs can be produced by a number of different processes yielding polyethylenes having a density less than 0.915 g/cm$^3$, typically 0.890 to 0.914 g/cm$^3$ or 0.900 to 0.914 g/cm$^3$.

A majority of global LDPE and LLDPE demand includes film, carrying bag, and sack applications. Some examples of these applications include agricultural, multi-layer, and shrink films. LDPE, which is soft, ductile, and flexible, is additionally utilized for strong, elastic goods, such as screw caps, lids, and coatings. There remains a demand for LDPE and LLDPE in the global marketplace, and consequently there is a continued need for improvements that provide cost savings.

Some improvements include using a different catalyst system. For example, some work has been done to provide branched polymers having a density of 0.940 g/cm$^3$ or less using metallocene compounds. JP2011089019A discloses a bridged metallocene in combination with a cocatalyst (an amine modified clay mineral, an alkyl alumoxane, or an ionized ionic compound) and an organoaluminum compound for olefin polymerization which can produce a polyolefin which possesses long chain branching, with high activity.

Other improvements have focused on the support technology. Alternative supports for metallocene and single-site catalysts have been the subject of numerous ongoing research projects. In particular, metallocenes supported on clay or ion-exchanged layered compounds have generated a great deal of interest. Olefin polymerization catalysts using clay, clay mineral, or acid/salt-treated (or a combination of both) ion-exchange layered compounds, an organoaluminum compound and a metallocene as components have been reported (see EP 0 511 665; EP 0 511 665; and U.S. Pat. No. 5,308,811). Likewise, U.S. Pat. Nos. 5,928,982 and 5,973,084 report olefin polymerization catalysts containing an acid or salt-treated (or a combination of both) ion exchange layered silicate, containing less than 1% by weight water, an organoaluminum compound, and a metallocene. Furthermore, WO 01/42320 discloses combinations of clay or clay derivatives as a catalyst support, an activator comprising any Group 1-12 metal or Group 13 metalloid, other than organoaluminum compound, and a Group 3-13 metal complex. Also, U.S. Pat. No. 6,531,552 and EP 1 160 261 report an olefin polymerization catalyst of an ion-exchange layered compound having particular acid strength and acid site densities. US 2003/0027950 reports an olefin polymerization catalyst utilizing ion-exchange layered silicates with a specific pore size distribution and having a carrier strength within a specific range.

U.S. Pat. No. 7,220,695 discloses catalyst systems comprising, inter alia, metallocene catalysts and supported activator systems comprising an ion-exchange layered silicate, an organoaluminum compound, and a heterocyclic organic compound, see Example 7 et seq.

Other background references include JP 2011-137146; US 2014-0179872; WO 2014/099307; WO 2014/099303; US 2009/0137755; US 2004/162403; US 2012/088890; US 2014/0179872; and US 2014/017988.

Accordingly, there is a need for new processes to produce polyethylene from supported high activity catalyst that have low cost methods of activation. More specifically, there is a need for new supported catalyst systems, particularly supported metallocene catalyst systems to produce polyethylene resin with low or negligible levels of long chain branching as it is known that high levels of long chain branching can be detrimental to the mechanical properties of PE film. It is further desirable that these new metallocene catalyst systems are robust and have high productivity, particularly in gas phase polymerization processes.

SUMMARY OF THE INVENTION

This invention relates to a process to polymerize olefins comprising: 1) contacting olefins with a catalyst system comprising optional activator, organoaluminum treated layered silicate support, and bridged metallocene compound represented by the following formula (I):

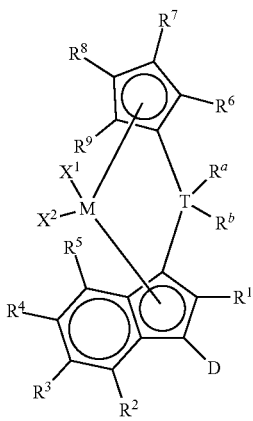

(I)

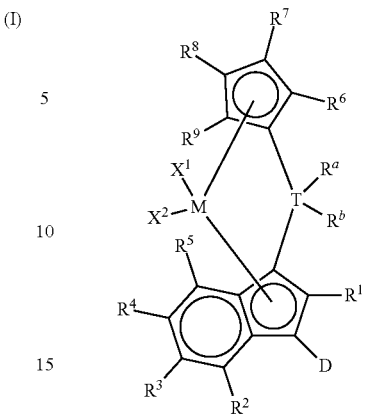

wherein:

M is a group 4 metal;

T is a group 14 atom;

D is a hydrogen, halide, alkoxide, or a $C_1$ to $C_{40}$ substituted or unsubstituted hydrocarbyl group, preferably D is a substituted or unsubstituted aromatic group;

$R^a$ and $R^b$ are independently, hydrogen, halogen, or a $C_1$ to $C_{20}$ substituted or unsubstituted hydrocarbyl, and $R^a$ and $R^b$ can form a cyclic structure including substituted or unsubstituted aromatic, partially saturated, or saturated cyclic, or fused ring system;

each $X^1$ and $X^2$ is independently selected from the group consisting of $C_1$ to $C_{20}$ substituted or unsubstituted hydrocarbyl groups, hydrides, amides, amines, alkoxides, sulfides, phosphides, halides, dienes, phosphines, and ethers, and $X^1$ and $X^2$ can form a cyclic structure including aromatic, partially saturated, or saturated cyclic or fused ring system;

each of $R^1$, $R^2$, $R^3$, $R^4$, and $R^5$ is, independently, hydrogen, halide, alkoxide or a $C_1$ to $C_{40}$ substituted or unsubstituted hydrocarbyl group, and any of adjacent $R^2$, $R^3$, $R^4$, and/or $R^5$ groups may form a fused ring or multicenter fused ring systems, where the rings may be substituted or unsubstituted, and may be aromatic, partially unsaturated, or unsaturated; and each of $R^6$, $R^7$, $R^8$, and $R^9$ is, each independently, hydrogen or a $C_1$ to $C_{40}$ substituted or unsubstituted hydrocarbyl group;

2) obtaining polyolefin having a g'vis of 0.90 or more and an MIR of 30 or less.

This invention also relates to a process to polymerize olefins comprising contacting olefins with a catalyst system comprising optional activator, organoaluminum treated layered silicate support and bridged metallocene compound represented by the formula (I) above where D is a substituted or unsubstituted aromatic group and at least two of R6, R7, R8, and R9 are C1 to C40 substituted or unsubstituted hydrocarbyl groups.

This invention also relates to a supported catalyst system comprising:

(i) a bridged metallocene compound represented by the following formula:

wherein:

M is a group 4 metal;

T is a group 14 atom;

D is a hydrogen, halide, alkoxide or a $C_1$ to $C_{40}$ substituted or unsubstituted hydrocarbyl group, preferably D is a substituted or unsubstituted aromatic group;

$R^a$ and $R^b$ are independently, hydrogen, halogen, or a $C_1$ to $C_{20}$ substituted or unsubstituted hydrocarbyl, and $R^a$ and $R^b$ can form a cyclic structure including substituted or unsubstituted aromatic, partially saturated, or saturated cyclic or fused ring system;

each $X^1$ and $X^2$ is independently selected from the group consisting of $C_1$ to $C_{20}$ substituted or unsubstituted hydrocarbyl groups, hydrides, amides, amines, alkoxides, sulfides, phosphides, halides, dienes, phosphines, and ethers, and $X^1$ and $X^2$ can form a cyclic structure including aromatic, partially saturated, or saturated cyclic or fused ring system;

each of $R^1$, $R^2$, $R^3$, $R^4$, and $R^5$ is, independently, hydrogen, halide, alkoxide or a $C_1$ to $C_{40}$ substituted or unsubstituted hydrocarbyl group, and any of adjacent $R^2$, $R^3$, $R^4$, and/or $R^5$ groups may form a fused ring or multicenter fused ring systems, where the rings may be substituted or unsubstituted, and may be aromatic, partially unsaturated, or unsaturated; and each of $R^6$, $R^7$, $R^8$, and $R^9$ is, each independently, hydrogen or a $C_1$ to $C_{40}$ substituted or unsubstituted hydrocarbyl group;

(ii) an optional activator; and (iii) an organoaluminum (preferably alkylaluminum) treated layered silicate support.

This invention also relates to a supported catalyst system comprising optional activator, organoaluminum treated layered silicate support and bridged metallocene compound represented by the formula (I) above where a D is a substituted or unsubstituted aromatic group and at least two of R6, R7, R8, and R9 are C1 to C40 substituted or unsubstituted hydrocarbyl groups.

BRIEF DESCRIPTION OF THE FIGURES

FIGS. 2A and 2B are the GPC of polyethylene resin produced in gas phase polymerization (Example C) using Supported Metallocene 2.

FIGS. 3A and 3B are the GPC of PE resin from gas phase polymerization (Example C) using Supported Metallocene 1.

FIGS. 4A and 4B are GPC of PE resin from slurry polymerization with TNOAL treated A-MKSF Metallocene 3 of Example 6.

FIGS. 5A and 5B are a GPC of PE resin from slurry polymerization with TNOAL treated A-MKSF Metallocene 3 of Example 5.

FIGS. 6A and 6B are the GPC of PE resin from a slurry polymerization with TNOAL treated A-MKSF Metallocene 3 of Example 7.

DETAILED DESCRIPTION OF THE INVENTION

Definitions

Figure 1:
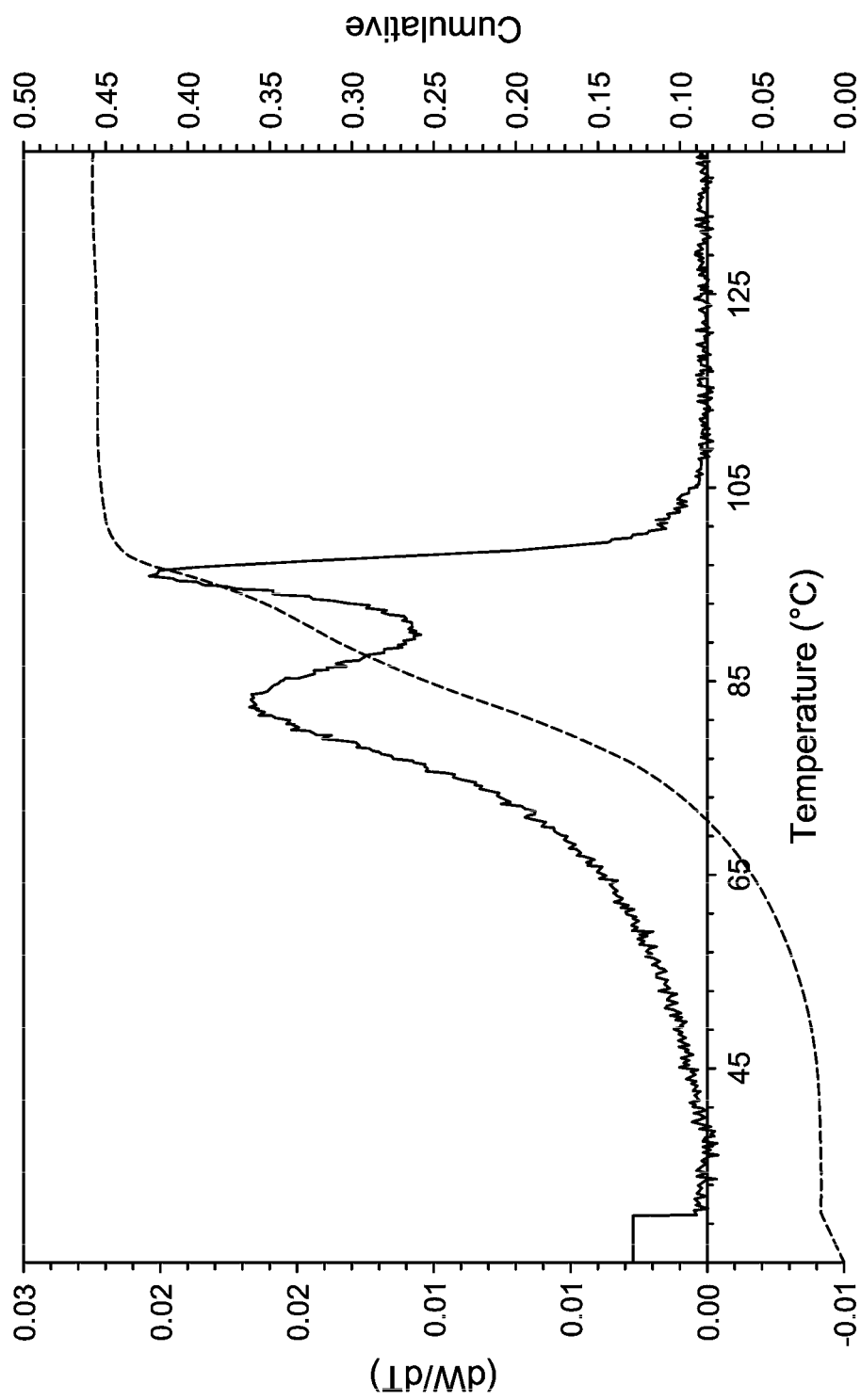
FIG. 1 is a TREF of the LLDPE produced in gas phase polymerization (Example C) with Supported Metallocene 2.
Figure 2A:
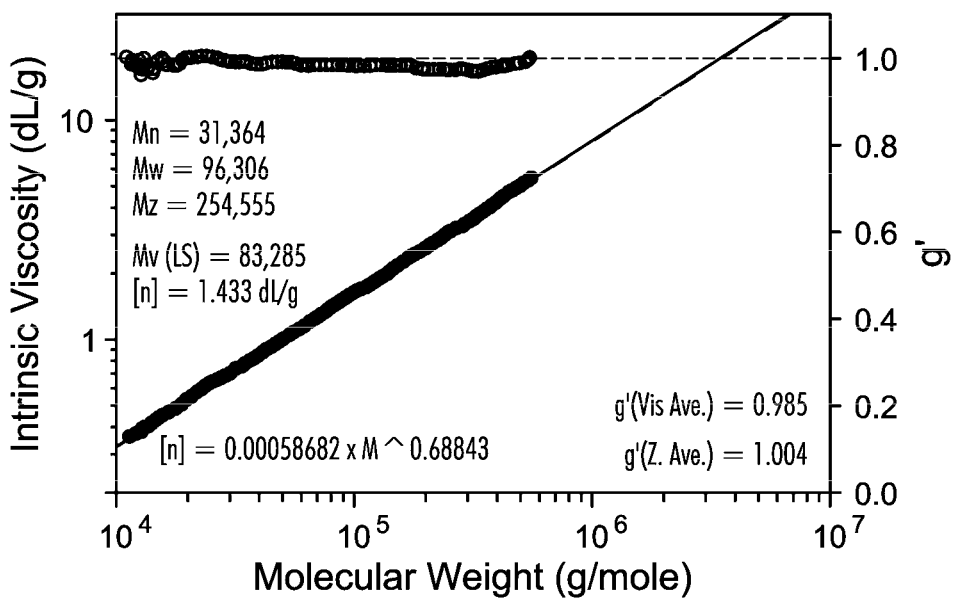
Figure 2A:
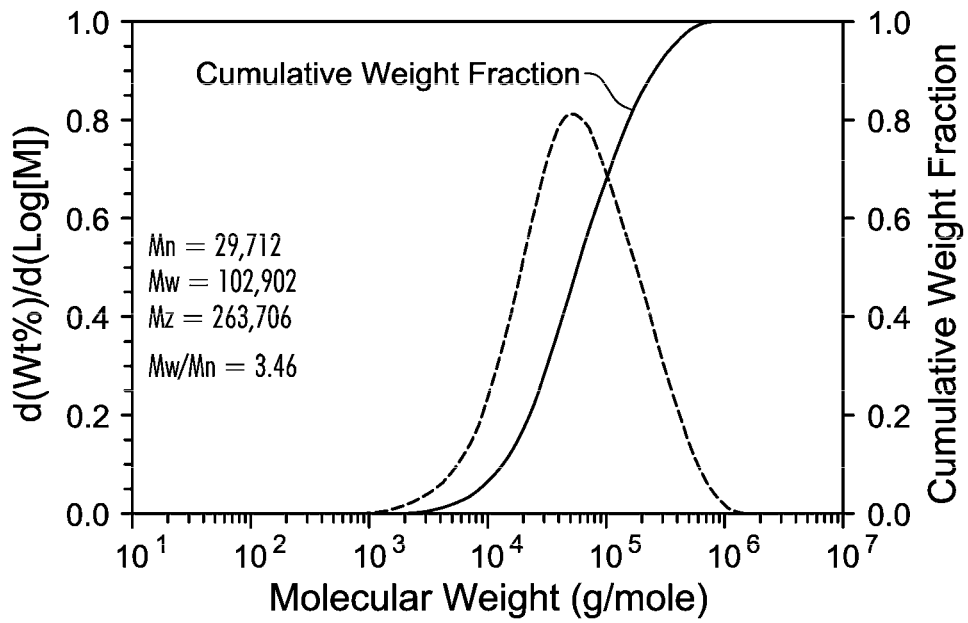

For purposes of this invention and the claims thereto, the new numbering scheme for the Periodic Table Groups is used as set out in CHEMICAL AND ENGINEERING NEWS, 63(5), p. 27 (1985). Therefore, a "Group 4 metal" is an element from Group 4 of the Periodic Table.

"Catalyst productivity" is a measure of how many grams of polymer (P) are produced using a polymerization catalyst comprising W g of catalyst (cat), over a period of time of T hours; and may be expressed by the following formula: P/(T×W) and expressed in units of gP/gcat/hr. "Catalyst activity" is a measure of how many grams of polymer are produced using a polymerization catalyst comprising W g of catalyst (cat) and may be expressed by the following formula: P/W and expressed in units of gP/g(cat), and is typically used for batch processes. Catalyst activity may be converted to catalyst productivity by taking into account the run time of the batch process: catalyst productivity=catalyst activity/T, where T is the run time in hours.

An "olefin," alternatively referred to as "alkene," is a linear, branched, or cyclic compound of carbon and hydrogen having at least one double bond. For the purposes of this invention and the claims thereto, when a polymer is referred to as "comprising an olefin," the olefin present in the polymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer.

A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. "Different," as used to refer to mer units, indicates that the mer units differ from each other by at least one atom or are different isomerically. Accordingly, the definition of polymer, as used herein, includes co- and terpolymers and the like and the definition of copolymer, as used herein, includes terpolymers and the like. An ethylene polymer is a polymer comprising more than 50 mol % ethylene, a propylene polymer is a polymer comprising more than 50 mol % propylene, a butene polymer is a polymer comprising more than 50 mol % butene, and so on.

As used herein, Mn is number average molecular weight (measured by Gel Permeation Chromatography, GPC), Mw is weight average molecular weight (measured by GPC), and Mz is z average molecular weight (measured by GPC), wt % is weight percent, mol % is mole percent, vol % is volume percent and mol is mole. Molecular weight distribution (MWD) is defined to be Mw (measured by GPC) divided by Mn (measured by GPC), Mw/Mn. Unless otherwise noted, all molecular weights (e.g., Mw, Mn, Mz) have units of g/mol.

A "catalyst system" is a combination of at least one metallocene compound, at least one activator, at least one support material, and optional co-activator. An "anionic ligand" is a negatively charged ligand which donates one or more pairs of electrons to a metal ion. A "neutral donor ligand" is a neutrally charged ligand which donates one or more pairs of electrons to a metal ion.

Metallocene Compounds

A metallocene compound is defined as an organometallic compound with at least one π-bound cyclopentadienyl moiety (or substituted cyclopentadienyl moiety) and more frequently two π-bound cyclopentadienyl-moieties or substituted moieties. This includes other π-bound moieties such as indenyls, or fluorenyls, or derivatives thereof.

For the purposes of this invention and the claims thereto, when catalyst systems are described as comprising neutral stable forms of the components, it is well understood by one of ordinary skill in the art, that the ionic form of the component is the form that reacts with the monomers to produce polymers.

This invention relates to bridged metallocene compounds supported on organoaluminum (preferably alkylaluminum) treated layered silicate support, where the compounds are represented by the following formula:

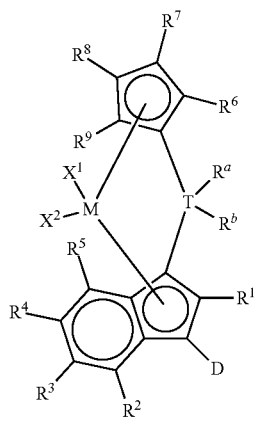

wherein:
M is a group 4 metal (preferably, M is zirconium or hafnium; more preferably, zirconium);
T is a group 14 atom (preferably, silicon or germanium; more preferably, silicon);
D is a hydrogen, halide, alkoxide or a $C_1$ to $C_{40}$ substituted or unsubstituted hydrocarbyl group (preferably D is a substituted or unsubstituted aromatic group, preferably D is selected from the group consisting of substituted or unsubstituted phenyl, naphthyl, biphenyl, cyclopropentyl, tropylium, cyclooctatetraenyl, furanyl, pyridinyl, borabenzyl, thiophenyl, azolyl, oxazolyl, and imidazolyl; more preferably, D is selected from the group consisting of substituted or unsubstituted phenyl, biphenyl, naphthyl, cyclopropentyl, furanyl, pyridinyl, thiophenyl, azolyl, oxazolyl, and imidazolyl, where "substituted or unsubstituted" refers to all members of the group listed);

$R^a$ and $R^b$ are independently, hydrogen, halogen, or a $C_1$ to $C_{20}$ substituted or unsubstituted hydrocarbyl, and $R^a$ and $R^b$ can form a cyclic structure including substituted or unsubstituted aromatic, partially saturated, or saturated cyclic or fused ring system (preferably, each $R^a$ and $R^b$ is independently selected from the group consisting of halides, $C_1$ to $C_{20}$ substituted or unsubstituted hydrocarbyl groups, and cyclic structures where $R^a$ and $R^b$ form a heterocyclopentyl, heterocyclobutyl, or heterocyclohexyl structure with T being the heteroatom; more preferably, each $R^a$ and $R^b$ is independently selected from the group consisting of chlorides, fluorides, methyl, and ethyl groups; more preferably, each $R^a$ and $R^b$ is, independently, selected from the group consisting of chlorides, fluorides, methyl, and ethyl groups);

each $X^1$ and $X^2$ is independently selected from the group consisting of $C_1$ to $C_{20}$ substituted or unsubstituted hydrocarbyl groups, hydrides, amides, amines, alkoxides, sulfides, phosphides, halides, dienes, phosphines, and ethers; and $X^1$ and $X^2$ can form a cyclic structure including aromatic, partially saturated, or saturated cyclic or fused ring system; more preferably, each $X^1$ and $X^2$ is independently selected from the group consisting of chlorides, fluorides, methyl, and ethyl groups;

each of $R^1$, $R^2$, $R^3$, $R^4$, and $R^5$ is, independently, hydrogen, halide, alkoxide or a $C_1$ to $C_{40}$ substituted or unsubstituted hydrocarbyl group, and any of adjacent $R^2$, $R^3$, $R^4$, and/or $R^5$ groups may form a fused ring or multicenter fused ring systems, where the rings may be substituted or unsubstituted, and may be aromatic, partially unsaturated, or unsaturated (preferably, each of $R^1$, $R^2$, $R^3$, $R^4$, and $R^5$ is, independently, a $C_1$ to $C_{20}$ substituted or unsubstituted hydrocarbyl group); and each of $R^6$, $R^7$, $R^8$, and $R^9$ is, each independently, hydrogen or a $C_1$ to $C_{40}$ substituted or unsubstituted hydrocarbyl group (preferably, each of $R^6$, $R^7$, $R^8$, and $R^9$ is, independently, a $C_1$ to $C_{40}$ substituted or unsubstituted hydrocarbyl group; more preferably, each of $R^6$, $R^7$, $R^8$, and $R^9$ is, independently, a $C_1$ to $C_{20}$ substituted or unsubstituted hydrocarbyl group; more preferably, each of $R^6$, $R^7$, $R^8$, and $R^9$ is, independently, selected from the group consisting of methyl, ethyl, propyl, isopropyl, n-butyl, sec-butyl, t-butyl, pentyl, hexyl, heptyl, octyl, decyl, and undecyl groups; even more preferably, each of $R^6$, $R^7$, $R^8$, and $R^9$ is, independently, selected from the group consisting of methyl, ethyl, and n-propyl groups; preferably adjacent $R^6$, $R^7$, $R^8$, and/or $R^9$ groups fuse together with the cyclopentadienyl group to form a substituted or unsubstituted fluorene);

further provided that at least two of $R^6$, $R^7$, $R^8$, and $R^9$ are preferably $C_1$ to $C_{40}$ substituted or unsubstituted hydrocarbyl groups.

In preferred embodiments, the metallocene compound is asymmetric, which is defined to mean that the groups that are bridged by the TRaRb bridge do not have the same number of fused aromatic rings, for example, the metallocene compound is not a bis-indenyl compound. Instead, the metallocene compound may be a cyclopentadienyl-indenyl compound, a cyclopentadienyl-fluorenyl compound, or a indenyl-fluorenyl compound, etc.

Preferred metallocene compounds may be represented by the following formula:

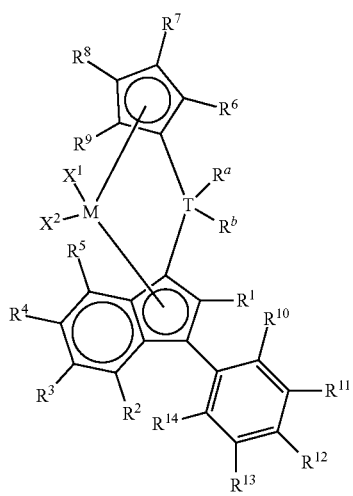

wherein $R^1$, $R^2$, $R^3$, $R^4$, $R^5$, $R^6$, $R^7$, $R^8$, $R^9$, $R^a$, $R^b$, $X^1$, $X^2$, T, and M are as defined above; and $R^{10}$, $R^{11}$, $R^{12}$, $R^{13}$, and $R^{14}$ are each independently H or a C1 to C40 substituted or unsubstituted hydrocarbyl.

Other preferred metallocene compounds useful herein may be represented by the formula:

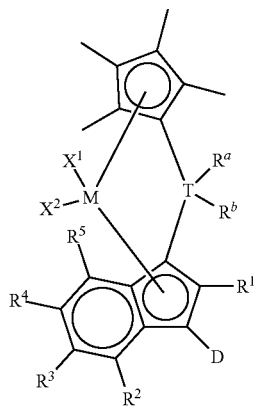

wherein $R^1$, $R^2$, $R^3$, $R^4$, $R^5$, $R^a$, $R^b$, $X^1$, $X^2$, T, D, and M are as defined above, preferably D is a substituted or unsubstituted aromatic group.

In particularly preferred embodiments, metallocene compounds useful herein may be represented by the following structure:

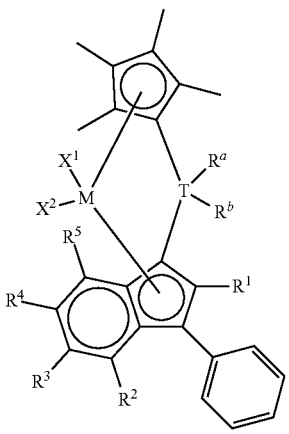

wherein $R^1$, $R^2$, $R^3$, $R^4$, $R^5$, $R^a$, $R^b$, $X^1$, $X^2$, T, and M are as defined above.

Metallocene Catalyst Systems

This invention also relates to a supported catalyst system comprising:
(i) any of the catalyst compounds described herein, such as bridged metallocene compounds represented by the following formula:

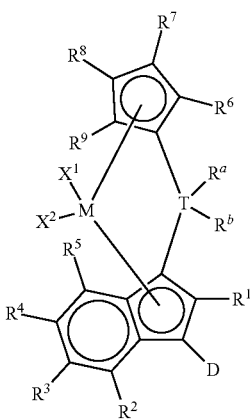

wherein:
M is a group 4 metal (preferably, M is zirconium or hafnium; more preferably, zirconium);
T is a group 14 atom (preferably, silicon or germanium; more preferably, silicon);
D is a hydrogen, halide, alkoxide or a $C_1$ to $C_{40}$ substituted or unsubstituted hydrocarbyl group (preferably D is a substituted or unsubstituted aromatic group, preferably D is selected from the group consisting of substituted or unsubstituted phenyl, naphthyl, biphenyl, cyclopropentyl, tropylium, cyclooctatetraenyl, furanyl, pyridinyl, borabenzyl, thiophenyl, azolyl, oxazolyl, and imidazolyl; more preferably D is selected from the group consisting of substituted or unsubstituted phenyl, naphthyl, biphenyl, cyclopropentyl, furanyl, pyridinyl, thiophenyl, azolyl, oxazolyl, and imidazolyl);
$R^a$ and $R^b$ are independently, hydrogen, halogen, or a $C_1$ to $C_{20}$ substituted or unsubstituted hydrocarbyl, and $R^a$ and $R^b$ can form a cyclic structure including substituted or unsubstituted aromatic, partially saturated, or saturated cyclic or fused ring system (preferably each $R^a$ and $R^b$ is independently selected from the group consisting of halides, $C_1$ to $C_{20}$ substituted or unsubstituted hydrocarbyl groups, and cyclic structures where $R^a$ and $R^b$ form a heterocyclopentyl, heterocyclobutyl, or heterocyclohexyl structure with T being the heteroatom; more preferably each $R^a$ and $R^b$ is independently selected from the group consisting of chlorides, fluorides, methyl, and ethyl groups; more preferably, each $R^a$ and $R^b$ is, independently, selected from the group consisting of chlorides, fluorides, methyl, and ethyl groups);
each $X^1$ and $X^2$ is independently selected from the group consisting of $C_1$ to $C_{20}$ substituted or unsubstituted hydrocarbyl groups, hydrides, amides, amines, alkoxides, sulfides, phosphides, halides, dienes, phosphines, and ethers; and $X^1$ and $X^2$ can form a cyclic structure including aromatic, partially saturated, or saturated cyclic or fused ring system; more preferably, each $X^1$ and $X^2$ is independently selected from the group consisting of chlorides, fluorides, methyl, and ethyl groups;
each of $R^1$, $R^2$, $R^3$, $R^4$, and $R^5$ is, independently, hydrogen, halide, alkoxide or a $C_1$ to $C_{40}$ substituted or unsubstituted hydrocarbyl group, and any of adjacent $R^2$, $R^3$, $R^4$, and/or $R^5$ groups may form a fused ring or multicenter fused ring systems, where the rings may be substituted or unsubstituted, and may be aromatic, partially unsaturated, or unsaturated (preferably, each of $R^1$, $R^2$, $R^3$, $R^4$, and $R^5$ is, independently, a $C_1$ to $C_{20}$ substituted or unsubstituted hydrocarbyl group); and
each of $R^6$, $R^7$, $R^8$, and $R^9$ is, each independently, hydrogen or a $C_1$ to $C_{40}$ substituted or unsubstituted hydrocarbyl group (preferably, each of $R^6$, $R^7$, $R^8$, and $R^9$ is, independently, a $C_1$ to $C_{40}$ substituted or unsubstituted hydrocarbyl group; more preferably, each of $R^6$, $R^7$, $R^8$, and $R^9$ is, independently, a $C_1$ to $C_{20}$ substituted or unsubstituted hydrocarbyl group; more preferably, each of $R^6$, $R^7$, $R^8$, and $R^9$ is, independently, selected from the group consisting of methyl, ethyl, propyl, isopropyl, n-butyl, sec-butyl, t-butyl, pentyl, hexyl, heptyl, octyl, decyl, and undecyl groups; even more preferably, each of $R^6$, $R^7$, $R^8$, and $R^9$ is, independently, selected from the group consisting of methyl, ethyl, and n-propyl groups;
preferably, adjacent $R^6$, $R^7$, $R^8$, and/or $R^9$ groups fuse together with the cyclopentadienyl group to form a substituted or unsubstituted fluorene);
further provided that, preferably at least two of $R^6$, $R^7$, $R^8$, and $R^9$ are $C_1$ to $C_{40}$ substituted or unsubstituted hydrocarbyl groups;
(ii) optionally, an activator (preferably, an alumoxane or a stoichiometric activator);
(iii) an organoaluminum (preferably alkylaluminum) treated layered silicate support material; and
(iv) optionally, a cocatalyst.

The metallocene catalyst system of this invention comprises a metallocene compound, an optional activator, an organoaluminum (preferably alkylaluminum) treated layered silicate support material. The metallocene compound may be any of the compounds described above. The activator, support material, and optional cocatalyst/scavenger are discussed below.

The catalyst compound is typically present on the support at a ratio of 0.005 to 0.08 mmol catalyst per gram support, preferably 0.01 to 0.06 mmol per gram support, preferably 0.03 to 0.05 mmol per gram support. The organoaluminum is typically present on the support at a ratio of 0.01 mmol to 2.0 mmol per gram support, preferably 0.1 mmol to 1.2 mmol per gram support, preferably 0.5 to 1.0 mmol gram support.

In a preferred embodiment of the invention, the catalyst system comprises 0 wt % (i.e., is absent) of a heterocyclic compound comprising one or more heteroatoms selected from Group 15 and 16, preferably the heteroatom(s) is nitrogen, oxygen and/or sulfur, most preferably nitrogen. The heterocyclic compounds may be unsubstituted, or one or more positions may be substituted. Non-limiting examples of heterocyclic compounds that are absent (e.g., 0 wt %) include substituted and unsubstituted pyrroles, imidazoles, pyrazoles, pyrrolines, pyrrolidines, purines, carbazoles, and indoles, phenyl indoles, 2,5-dimethyl pyrroles, 3-pentafluorophenyl pyrrole, 4,5,6,7-tetrafluoroindole or 3,4-difluoropyrroles.

In a preferred embodiment of the invention, the catalyst system comprises 0 wt % (i.e., is absent) of a heterocyclic compound (an indole) represented by the Formula:

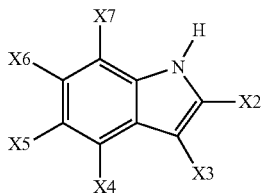

where each of X2 X3, X4, X5, X6 and X7 is, independently, selected from hydrogen, halogen, preferably chlorine, bromine or fluorene, more preferably bromine or fluorene and most preferably fluorene, and alkyl group, an aryl group, an alkoxide group, an aryloxide group or an alkyl substituted aryl group wherein the groups may be halogenated or partially halogenated, preferably containing a fluorene atom and/or a bromine atom.

Activators

The term "activator" is used herein to be any compound which can activate any one of the metallocene compounds described above by converting the neutral catalyst compound to a catalytically active metallocene compound cation. Activators useful herein include alumoxanes and stoichiometric activators.

Alumoxanes

Useful activators typically include alumoxane compounds (or "alumoxanes") and modified alumoxane compounds. Alumoxanes are generally oligomeric compounds containing —Al(R¹)—O— sub-units, where R¹ is an alkyl group. Examples of alumoxanes include methylalumoxane (MAO), modified methylalumoxane (MMAO), ethylalumoxane, isobutylalumoxane, and mixtures thereof. Alkylalumoxanes and modified alkylalumoxanes are suitable as catalyst activators, particularly when the abstractable ligand is an alkyl, halide, alkoxide, or amide. Mixtures of different alumoxanes and modified alumoxanes may also be used. It may be preferable to use a visually clear methylalumoxane. A cloudy or gelled alumoxane can be filtered to produce a clear solution or clear alumoxane can be decanted from the cloudy solution. Another useful alumoxane is a modified methylalumoxane (MMAO) cocatalyst type 3A (commercially available from Akzo Chemicals, Inc. under the trade name Modified Methylalumoxane type 3A, covered under U.S. Pat. No. 5,041,584). In preferred embodiments of this invention, the activator is an alkylalumoxane, preferably methylalumoxane or isobutylalumoxane.

Stoichiometric Activators

In preferred embodiments, the catalyst system of this invention further comprises one or more stoichiometric activators. A stoichiometric activator is a non-alumoxane compound which when combined in a reaction with the metallocene compound forms a catalytically active species at a molar ratio of stoichiometric activator to metallocene compound of 10:1 or less (preferably 5:1, more preferably 2:1, or even more preferably 1:1). It is within the scope of this invention to use a molar ratio of stoichiometric activator to metallocene compound of greater than 10:1. However, one of skill in the art would appreciate that the stoichiometric activator would be in excess and that a catalytically active species may be obtained using a molar ratio of stoichiometric activator to metallocene compound of 10:1 or less.

Ionic Stoichiometric Activators

Ionic stoichiometric activators may contain an active proton, or some other cation associated with, but not coordinated to, or only loosely coordinated to, the remaining anion of the activator. Such compounds and the like are described in European publications EP 0 570 982; EP 0 520 732; EP 0 495 375; EP 0 500 944; EP 0 277 003; EP 0 277 004; U.S. Pat. Nos. 5,153,157; 5,198,401; 5,066,741; 5,206,197; 5,241,025; 5,384,299; 5,502,124; and U.S. Ser. No. 08/285,380, filed Aug. 3, 1994.

Bulky Ionic Stoichiometric Activators

"Bulky activator" as used herein refers to ionic stoichiometric activators represented by the formula:

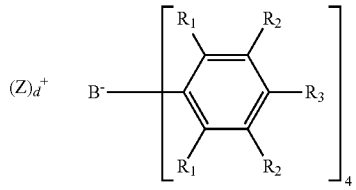

where:
each $R_1$ is, independently, a halide, preferably a fluoride;
each $R_2$ is, independently, a halide, a $C_6$ to $C_{20}$ substituted aromatic hydrocarbyl group or a siloxy group of the formula —O—Si—$R_a$, where $R_a$ is a $C_1$ to $C_{20}$ substituted or unsubstituted hydrocarbyl or hydrocarbylsilyl group (preferably, $R_2$ is a fluoride or a perfluorinated phenyl group);
each $R_3$ is a halide, $C_6$ to $C_{20}$ substituted aromatic hydrocarbyl group or a siloxy group of the formula —O—Si—$R_a$, where $R_a$ is a $C_1$ to $C_{20}$ substituted or unsubstituted hydrocarbyl or hydrocarbylsilyl group (preferably, $R_3$ is a fluoride or a $C_6$ perfluorinated aromatic hydrocarbyl group); wherein $R_2$ and $R_3$ can form one or more saturated or unsaturated, substituted or unsubstituted rings (preferably, $R_2$ and $R_3$ form a perfluorinated phenyl ring); $(Z)_d^+$ is the cation component; where Z is (L-H) or a reducible Lewis Acid, L is a neutral Lewis base; H is hydrogen; $(L-H)^+$ is a Bronsted acid; and d is an integer from 1 to 3;
wherein the boron anion component has a molecular weight of greater than 1020 g/mol; and
wherein at least three of the substituents on the B atom each have a molecular volume of greater than 250 cubic Å, alternately greater than 300 cubic Å, or alternately greater than 500 cubic Å.

Activator Combinations

It is within the scope of this invention that metallocene compounds can be combined with one or more activators or activation methods described above. For example, a combination of activators have been described in U.S. Pat. Nos. 5,153,157; 5,453,410; EP 0 573 120 B1; WO 94/07928; and WO 95/14044. These documents all discuss the use of an alumoxane in combination with a stoichiometric activator.

Optional Cocatalysts

In addition to these alumoxane activator compounds, cocatalysts may be used. Aluminum alkyl or organometallic compounds, which may be utilized as cocatalysts (or scavengers) include, for example, triethylaluminum, tri-isobutylaluminum, tri-n-hexylaluminum, tri-n-octylaluminum, diethyl aluminum chloride, dibutyl zinc, diethyl zinc, and the like.

Preferably, cocatalyst is present at a molar ratio of cocatalyst metal to transition metal of less than 100:1, preferably less than 50:1, preferably less than 15:1, preferably less than 10:1. In alternate embodiments, the cocatalyst is present at 0 wt %.

Other additives may also be used, as desired, such as one or more scavengers, promoters, modifiers, reducing agents, oxidizing agents, aluminum alkyls, or silanes.

Layered Silicate Supports

This invention relates to catalyst systems comprising alkyl aluminum treated layered silicate supports. The layered silicate may be an ion exchanged layered silicate.

Preferred ion-exchange layered silicate useful in the present invention are silicate compounds having crystal structures wherein layers formed by strong ionic and covalent bonds are laminated in parallel with weak ionic bonding, and the ions contained between the layers are exchangeable. Most ion-exchange layered silicates naturally occur as the main component of clay minerals, but these ion-exchange layered silicates may be artificially synthesized materials. Preferred ion-exchange layered silicates useful in this invention include natural or synthetic montmorillonite, nontronite, beidellite, volkonskoite, laponite, hectorite, saponite, sauconite, stevensite, vermiculite, halloysite, aluminate oxides, bentonite, kaolinite, dickite, smectic clays, mica, magadiite, kenyaite, octosilicate, kanemite, makatite, attapulgite, sepiolite, zeolitic layered materials (such as ITQ-2, MCM-22, and ferrierite precursors) and mixtures thereof. In a preferred embodiment, the ion-exchange layered silicate is acidified by contacting with an acid (such as sulfuric acid, hydrochloric acid, a carboxylic acid, an amino acid, or the like.)

In some embodiments, the ion-exchange layered silicate has an average particle size of from 0.02 to 200 microns, preferably from 0.25 to 100 microns, even more preferably 0.5 to 50 microns. In some embodiments the ion exchange layered silicates have a bi-modal distribution, or even multimodal distribution, of particle sizes. (Particle size, also referred to as "average particle size," "particle diameter," or "average particle diameter," is determined using a Mastersizer™ 3000 (range of 1 to 3500 μm) available from Malvern Instruments, Ltd. Worcestershire, England.)

The ion-exchange layered silicate may be used in a dry state and/or may be used also in a slurry state in liquid. Also, the shape of the ion-exchange layered silicate is not specially limited, and the shape may be a naturally occurring shape, an artificially synthesized shape or a shape of an ion-exchange layered silicate obtained after subjected to pulverizing, granulating and classifying. Among these shapes, it is preferable to use a granulated ion-exchange layered silicate since such an ion-exchange layered silicate used as a catalyst component provides satisfactory polymer particle properties.

In some embodiments the ion-exchange layered silicates are used in the absence of other support type compounds. Likewise, in other embodiments the ion exchange layered silicates are combined with other support type compound and used in this invention. For example, an ion exchange layered silicate, such as montmorillonite, may be combined with silica then combined with the organoaluminum compound (preferably an alkylaluminum compound. In another embodiment, the ion-exchange layered silicate may be utilized as part of an agglomerate (as described in US 2003/0096698 and U.S. Pat. No. 6,559,090 and are herein fully incorporated by reference), with at least one inorganic oxide component selected from $SiO_2$, $Al_2O_3$, MgO, $AlPO_4$, $TiO_2$, $ZrO_2$, or $Cr_2O_3$.

Processing of a shape of an ion-exchange layered silicate by granulating, pulverizing or classifying may be carried out before chemical treatment (that is, the ion-exchange layered silicate having a shape previously processed may be subjected to the chemical treatment), or an ion-exchange layered silicate may be subjected to processing of a shape after chemical treatment. Processing may occur before or after chemical treatment with an organoaluminum compound and/or treatment with a polymerization catalyst.

Particularly useful supports include magnesia, titania, zirconia, montmorillonite (EP 0 511 665), phyllosilicate, zeolites, talc, clays (U.S. Pat. No. 6,034,187) and the like. Other useful supports include magnesia, titania, zirconia, magnesium chloride (U.S. Pat. No. 5,965,477), montmorillonite (EP 0 511 665).

Chemical Treatment of Ion-Exchange Layered Silicate

The chemical treatment of an ion-exchange layered silicate is carried out by bringing it in contact with an acid, a salt, an alkali, an oxidizing agent, a reducing agent or a treating agent containing a compound intercalatable between layers of an ion-exchange layered silicate. The intercalation means to introduce other material between layers of a layered material, and the material to be introduced is called a guest. Among these treatments, acid treatment or salt treatment is particularly preferable.

Chemical Treatment Protocol

Acid Treatment

An acid treatment removes impurities on the surface or ion-exchanges a cation present between layers, and in addition to this function, the acid treatment elutes a part or whole of cations such as Al, Fe, Mg, or the like in a crystal structure. Examples of an acid used in acid treatment include hydrochloric acid, nitric acid, sulfuric acid, phosphoric acid, acetic acid, and oxalic acid, and the like. Particularly, it is preferable to use an inorganic acid. Usually the acid is used in a form of an acid aqueous solution. The acid used in the treatment may be a mixture of at least two kinds of acids. In a preferred embodiment, the acid used herein is sulfuric acid.

A particular embodiment of the present invention is to carry out a treatment with an acid having a specific concentration. Any concentration of acid may be used, however higher acid concentrations (and higher temperatures) are more efficient. In particular, using an acid concentration of more than 5 wt % (based upon the weight of the acid, any liquid diluent or solvent and the ion exchange layered silicate present), preferably more than 10 wt %, more preferably more than 15 wt % has been found to be effective. In a preferred embodiment, the treatment is performed at temperatures of more than 50° C., preferably more than 70° C., more preferably at more than 90° C. The treatment preferably is allowed to react for 5 minutes to 10 hours, more preferably 30 minutes to 8 hours, more preferably 1 to 6 hours. In a particularly preferred embodiment, the treatment occurs at 90° C. or more for 2 to 6 hours using an acid concentration of more than 15 wt %. In another particularly preferred embodiment, the treatment occurs at 100° C. or more for 2 to 4 hours using an acid concentration of more than 15 wt %.

Generally, it is known that by subjecting the silicate to acid treatment, impurities on the surface are removed and cations such as Al, Fe, Mg, or the like in a crystal structure are eluted, thereby increasing the surface area. Thus, in accordance with the progress of acid treatment, it is considered that the surface area and a pore volume are increased. However, in case of such concentrated acid treatment as carried out in the present invention, a surface area value of a silicate treated by the concentrated acid treatment employing such an acid concentration as defined as above is rather smaller than a surface area of a silicate treated by an acid treatment employing a lower acid concentration to have the same substituting components eluted. This fact means that a pore size of the silicate becomes larger. It is expected that this change achieves an effect of easily moving a material between an outer part and an inner part of a catalyst. Thus, a silicate treated by an acid having a high concentration provides a larger pore size, and it is expected that mass transport (of a metallocene complex, a monomer, an organoaluminum compound, a heterocyclic organic compound or the like) becomes easy in the inside of a catalyst or constituting particles in the same manner as in the outside. Accordingly, a catalyst prepared from the silicate of the present invention has active sites more uniformly dispersed, and it is considered that local heat generation on the catalyst is inhibited as compared with a conventional catalyst. Particularly, when producing an easily meltable or soluble polymer, e.g., in a case of low melting point random polymerization of a propylene type monomer, it is possible to carry out polymerization at a high activity and in a state of maintaining dispersed particles, which could not be conventionally achieved. After appropriate acid treatment the ion-exchange layered silicate will preferably have a surface area in the range of 100 to 450 m$^2$/g, preferably 150 to 400 m$^2$/g, more preferably 200-350 m$^2$/g.

An acid used for the concentrated acid treatment may be the same as those used in an ordinary acid treatment, but is preferably sulfuric acid, nitric acid, or hydrochloric acid, more preferably sulfuric acid.

Salt Treatment

Further, in the present invention, one may carry out a salt treatment. The salt treatment means a treatment carried out for the purpose of exchanging cations in an ion-exchange layered silicate. The treating conditions with a salt are not specially limited, but it is preferable to carry out the salt treatment under conditions of a salt concentration of from 0.1 to 50 wt %, a treating temperature of from room temperature to a boiling point and a treating time of from 5 minutes to 24 hours in such a manner as to elute at least a part of materials constituting an ion-exchange layered silicate. Also, the salt may be used in an organic solvent such as toluene, n-heptane, ethanol or the like, or may be used in the absence of a solvent if it is liquid-like at the treating temperature, but it is preferably used as an aqueous solution. However, depending on a kind of a salt employed, the salt treatment achieves an effect similar to an acid treatment.

In the present invention, it is preferable to ion exchange at least 40%, preferably at least 60% of ion exchangeable cations of Group 1 metals contained in an ion-exchange layered silicate with cations dissociated from the salts as described above. After carrying out the above chemical treatment, it is preferable to remove ions eluted from the treatment and an excess amount of a treating agent. For this operation, water or an organic solvent is generally used.

After dehydrating, drying is carried out generally at a drying temperature of from 100 to 800° C., preferably from 150 to 600° C.

Drying of Chemically Treated Ion-Exchange Layered Silicate

These ion-exchange layered silicates change their properties depending on a drying temperature employed even when their structures are not destroyed, and it is therefore preferable to change a drying temperature depending on their uses. The drying period is usually in a range of from 1 minute to 24 hours, preferably from 5 minutes to 6 hours, and a drying atmosphere is preferably dry air, dry nitrogen, dry argon, or carried out under reduced pressure. A drying method is not specially limited, but various methods may be employed.

In a preferred embodiment, ion-exchange layered silicates subjected to both acid and/or salt (or a combination thereof) chemical treatments described above, have one or more of the following features (as outlined in U.S. Pat. No. 6,531,552 and US 2003/0027950 and hereby fully incorporated by reference):

(1) an amount of acid sites having a pKa of −8.2 or less of 0.05 mmol/g (where the amount is equivalent to the mmol/g of 2,6-dimethylpyridine consumed for neutralization), (2) performance that in desorption isotherm by nitrogen adsorption-desorption method, a ratio of a remaining adsorption amount (b) at a relative pressure P/Po=0.85 to an adsorption amount (a) at a relative pressure P/Po=1 satisfies the formula, (b)/(a)≥0.8, (3) performance that in adsorption isotherm and desorption isotherm by nitrogen adsorption-desorption method, a difference between a remaining adsorption amount (b) at a relative pressure P/Po=0.85 and an adsorption amount (c) in adsorption isotherm at a relative pressure P/Po=0.85 satisfies the formula, (b)-(c)>25 (cc/g), (4) a pore size distribution curve calculated from the desorption isotherm by nitrogen adsorption-desorption method, a pore diameter $D_m$ showing a maximum peak intensity $D_{VM}$ from 60 to 200 Å, (5) in a pore size distribution curve calculated from desorption isotherm by nitrogen adsorption-desorption method, a pore diameter $D_{m1/2}$(Å) on the smaller pore size side corresponding to a ½ peak intensity of the maximum peak intensity $D_{VM}$ has a relation of $D_{m1/2}/D_m$ of at least 0.65 and less than 1, provided that the largest value is employed when there are a plurality of $D_{m1/2}$ values, and/or (6) an average crushing strength of at least 3 MPa as measured by a minute compression tester.

(1) Acid Strength/Acid Site Density

The term "acid" used herein is one category classifying a material, and is defined as a material of Bronsted acid or Lewis acid. Also, the term "acid site" is defined as a constituting unit of a material exhibiting a property as an acid, and for the present invention, its amount is analyzed by the method described in U.S. Pat. No. 6,531,552 and is hereby fully incorporated by reference. When a chemically treated ion-exchange layered silicate is used as the support or carrier, the amount of a specific acidity is measured with regard to a silicate obtained after the chemical treatment.

In one embodiment, the ion-exchange layered silicate is acidic in nature as determined by titration methods as outlined in U.S. Pat. No. 6,531,552, which is hereby fully incorporated by reference.

In another embodiment, it is important to control an acidity and amount of acid sites, so as to afford an ion-exchange layered silicate that contains aluminum in an atomic ratio of Al/Si in a range of from 0.05 to 0.4, preferably from 0.05 to 0.25, more preferably from 0.07 to 0.23. The Al/Si atomic ratio is regarded as an index of acid treatment of the clay constituent. Furthermore, the chemically treated ion-exchange layered silicate having an acid site of at most −8.2 pKa, with the amount of acid site being equivalent to at least 0.05 mmol/g of 2,6-dimethylpyridine consumed for neutralization (as described in U.S. Pat. No. 6,531,552). In general, the preferred amount of acid sites present in the ion-exchange layered silicate is 0.05 mmol/g or more and the amount of acid sites is preferably as high as possible.

(2) Performance in Nitrogen Adsorption/Desorption Isotherm

In the present invention, measurement of the adsorption and desorption isotherm by nitrogen adsorption-desorption method are carried out in accordance with the Brunauer-Emmett-Teller (BET) method using adsorption-desorption of nitrogen (temperature of liquid nitrogen, 77 K) with a Micromeritics Tristar II 3020 instrument after degassing of the powders for 4 hrs. at 350° C. More information regarding the method can be found, for example, in "*Characterization of Porous Solids and Powders: Surface Area, Pore Size and Density*", S. Lowell et al., Springer, 2004.

In general, the nitrogen adsorption-desorption isotherms for ion-exchange layered silicates exhibit an adsorption hysteresis. Detailed descriptions of adsorption-desorption fundamentals, including hysteresis, are discussed in "Adsorption Technology and Design" by Crittenden and Thomas and is incorporated by reference.

In one embodiment, the chemically treated ion-exchange layered silicate performance in the nitrogen adsorption-desorption isotherm exhibits a hysteresis.

In a preferred embodiment, the ion-exchange layered silicate exhibits the following performance in the nitrogen adsorption-desorption isotherm: that in desorption isotherm by nitrogen adsorption-desorption method, a ratio of a remaining adsorption amount (b) at a relative pressure P/Po=0.85 to an adsorption amount (a) at a relative pressure P/Po=1 satisfies the formula, (b)/(a)≥0.8, (3) performance that in adsorption isotherm and desorption isotherm by nitrogen adsorption-desorption method, a difference between a remaining adsorption amount (b) at a relative pressure P/Po=0.85 and an adsorption amount (c) in adsorption isotherm at a relative pressure P/Po=0.85 satisfies the formula, (b)-(c)>25 (cc/g).

Examples of the analyzing apparatus include commercially available products such as Autosorb of Quantachrome Company or Omnisorp of Coulter Inc. or the like.

(3) Pore Size Distribution

The evaluation of the pore size distribution in the present invention employs the desorption isotherm. The desorption isotherm is a curve obtained while reducing the relative pressure. The desorption isotherm shows a lower relative pressure to the same desorbed gas amount as compared with adsorption isotherm, and consequently shows a lower free energy state, and is generally considered to be closer to a state of real thermodynamic stability.

In one embodiment, an ion-exchange layered silicate with any pore size and or any pore size distribution may be used.

In another embodiment, included in this invention is the preferred pore size distributions of the ion-exchange layered silicate as described in US 2003/0027950 (which is fully incorporated herein by reference) and listed above in "features" 4 and 5. Where $D_m$ (from differential values of pore volumes) represents a pore size diameter showing a maximum peak intensity and is generally expressed as "most frequently appearing pore diameter", $D_{VM}$ represents a maximum peak intensity and $D_{m1/2}$ represents a pore size diameter on the smaller diameter side corresponding to a point, the peak intensity of which is ½ of the maximum peak intensity. A pore diameter $D_{m1/2}$ is present at least one respectively on both sides of D, i.e., on the larger diameter side of $D_m$ and on the smaller diameter side of $D_m$, but a value on the smaller diameter side is taken as the $D_{m1/2}$ value in the present invention. Also, if there are a plurality of $D_{m1/2}$ values on the smaller diameter side, the largest value is employed for calculation. In one embodiment, the $D_{m1/2}/D_m$ can range from 0.1 to 0.9. In another embodiment, a $D_{m1/2}/D_m$ value is preferably at least 0.68, more preferably at least 0.70. Furthermore, a pore size distribution curve calculated from desorption isotherm by nitrogen adsorption-desorption method, a pore diameter $D_{m1/3}$(Å) on the smaller pore size side corresponding to a ⅓ peak intensity of the maximum peak intensity $D_{vm}$ has a relation of $D_{m1/3}/D_m$ of at least 0.55 and less than 1, provided that the largest value is employed when there are a plurality of $D_{m1/3}$ values. In an analogous manner as $D_{m1/2}$, a pore diameter $D_{m1/3}$ value is present respectively on both sides of $D_m$, i.e., at least one on the larger diameter side of $D_m$ and at least one on the smaller diameter side of $D_m$, but a value on the smaller diameter side is defined as $D_{m1/3}$. Also, when there are a plurality of $D_{m1/3}$ values on the smaller diameter side, the largest value is employed for calculation. A $D_{m1/3}/D_m$ value is preferably at least 0.56, more preferably at least 0.57. If the $D_{m1/3}/D_m$ value is less than 0.56, a considerable amount of smaller diameter pores are present, which is not preferred.

Moreover, the pore size distribution calculated for desorption isotherm by nitrogen adsorption-desorption method is a substantially unimodal peak. That is, there is not present a second peak, and if it is present, its intensity is at most 50%, preferably at most 40%, particularly at most 30% of a maximum peak intensity $D_{VM}$.

Also, the pore size distribution curve calculated from desorption isotherm by nitrogen adsorption-desorption method, wherein a peak intensity at a pore diameter of 50 Å is defined as $D_{v50A}$, $D_{v50A}/D_{VM}$ is at least 0.01 and at most 0.40, preferably at least 0.03 and at most 0.38, more preferably at least 0.05, and at most 0.36. If the $D_{v50A}/D_{VM}$ value exceeds 0.38, a considerable amount of smaller diameter pores are contained.

Thus, an ion-exchange layered silicate may have a predetermined pore size, but its pore size is sufficiently large to accept a metallocene complex, an activator, an organoaluminum compound, and a monomer. Accordingly, these compounds participating in the reaction easily enter into pores in respective stages of formation of a catalyst, activation, prepolymerization and polymerization, and complexes are highly dispersed in carriers, and consequently metallocene catalyst active sites are thought to be uniformly formed. In a preferred embodiment, the ion exchange layered silicate has a pore size that is sufficiently large enough that the catalyst compound, the organoaluminum and activator compounds may freely enter and diffuse evenly within the particle. Preferred pore sizes include 40 Angstroms to 500 Angstroms, preferably 50 Angstroms to 300 Angstroms, more preferably 70 to 200 Angstroms.

(4) Carrier Strength

In one embodiment, the ion exchange layered silicate may have any compression fracture strength (also called average crushing strength) as measured by a minute compression tester. Preferably the ion exchange layered silicate has a compression fracture strength of 3 to 20 MPa. Preferably, the average crushing strength is at least 5 MPa, more preferably at least 7 MPa. In addition, the upper limit of the ion exchange layered silicate strength is preferably an average crushing strength of at most 20 MPa, more preferably at most 18 MPa.

Organoaluminum Compound

In the present invention ion-exchange layered silicate is preferably contacted with an organoaluminum compound, optionally before treatment with the catalyst and/or activator compounds.

In an embodiment, useful organoaluminum compounds include alkylaluminum compounds and optional alkylalumoxanes. In a preferred embodiment, the organoalumimum is absent alkyl alumoxane. In an alternate embodiment, the organoaluminum compound comprises alkyl aluminum and 0 to 20 wt % alkyl alumoxane, alternately 0.1 to 15 wt %, alternately 0.5 to 10 wt % of alkyl alumoxane, based upon the weight of the organo aluminum compounds present on the support. In an alternate embodiment, alkyl alumoxane is present at 0 wt %.

In one embodiment, preferred organoaluminum compounds described above are represented by the formula:

$$AlR_3 \qquad \text{(Formula I)}$$

wherein each R is independently a substituted or unsubstituted alkyl group and/or a substituted or unsubstituted aryl group. Preferably R is an alkyl group containing 1 to 30 carbon atoms. Preferred R groups include methyl, ethyl, propyl, butyl, pentyl, hexyl, heptyl, octyl, nonyl, decyl, undecyl, docecyl, aryl, and all isomers thereof.

The organoaluminum compounds include alkylaluminum compounds where the alkyl is a C1 to C40 linear, branched or cyclic alkyl, preferably a C1 to C12 linear or branched alkyl, preferably methyl, ethyl, propyl, butyl, isobutyl, n-butyl, isopentyl, pentyl, hexyl, octyl, nonyl, decyl or dodecyl, even more preferably methyl, ethyl, propyl, butyl, isobutyl, n-butyl, or hexyl. Preferred organoaluminum compounds include those represented by the formula:

$$AlR_nY_{3-n} \qquad \text{(Formula II)}$$

where R is a hydrocarbon group having a carbon number of from 1 to 30, preferably 4 to 12, Y is hydrogen, halogen, an alkoxy group or a siloxy group, and n is 1, 2, or 3. Particularly preferred alkyl aluminum compounds useful in this invention include: trimethylaluminum, triethylaluminum, triisobutylaluminum, tri-n-hexylaluminum, tri-n-octylaluminum, tri-iso-octylaluminum, triphenylaluminum, and combinations thereof.

In another embodiment, the organoaluminum compounds also include combinations of organoaluminum compounds. For example, it is possible to use a mixture of organoaluminum compounds such as two or more of rimethylaluminum, triethylaluminum, triisobutylaluminum, tri-n-hexylaluminum, tri-n-octylaluminum, tri-iso-octylaluminum, and triphenylaluminum.

In another embodiment, the organoaluminum compound comprises one or more alumoxanes (at typically 20 wt % or less) which are generally oligomeric compounds containing —Al(R)—O— or —Al(R)$_2$—O— subunits, where R is an alkyl group, preferably a C$_1$ to C$_{40}$ linear, branched or cyclic alkyl, preferably a C$_1$ to C$_{12}$ linear or branched alkyl, preferably methyl, ethyl, propyl, butyl, isobutyl, n-butyl, isopentyl, pentyl, hexyl, octyl, nonyl, decyl or dodecyl, even more preferably methyl, ethyl, propyl, butyl, isobutyl, n-butyl, or hexyl. Examples of alumoxanes include methylalumoxane (MAO), modified methylalumoxane (MMAO), ethylalumoxane, isobutylalumoxane, tetraethyldialumoxane, and di-isobutylalumoxane. Alumoxanes may be produced by the hydrolysis of the respective trialkylaluminum compound. MMAO may be produced by the hydrolysis of trimethylaluminum and a higher trialkylaluminum such as triisobutylaluminum. There are a variety of methods for preparing alumoxane and modified alumoxanes, non-limiting examples of which are described in U.S. Pat. Nos. 4,665,208; 4,952,540; 5,091,352; 5,206,199; 5,204,419; 4,874,734; 4,924,018; 4,908,463; 4,968,827; 5,308,815; 5,329,032; 5,248,801; 5,235,081; 5,157,137; 5,103,031; 5,391,793; 5,391,529; 5,693,838; 5,731,253; 5,731,451; 5,744,656; 5,847,177; 5,854,166; 5,856,256; 5,939,346; EP 0 561 476; EP 0 279 586; EP 0 594 218; and EP 0 586 665; WO 94/10180; and WO 99/15534; all of which are fully incorporated herein by reference.

Preferred alkylalumoxanes include methylalumoxane, modified methylalumoxane, and ethylalumoxane. Useful modified methyl alumoxane can be purchased under the Tradename MMAO 3A™ from AkzNobel, Pasadena, Tex.

Contact between an ion-exchange layered silicate and an organoaluminum compound can be carried out under an inert gas atmosphere such as nitrogen in a solvent of an inert hydrocarbon such as hexane, heptane, pentane, cyclohexane, benzene, toluene, xylene or the like, and the solvent may be used alone or in a mixture of two or more.

An amount of an organoaluminum compound used is preferably from 0.01 to 1000 mmol, more preferably from 0.1 to 100 mmol, per 1 g of an ion-exchange layered silicate.

A concentration of an ion-exchange layered silicate in a solvent is preferably from 0.001 to 100 g/mL, more preferably from 0.01 to 10 g/mL, and a concentration of an organoaluminum compound is preferably from 0.001 to 100 mmol/mL, more preferably from 0.01 to 10 mmol.

Contacting may be carried out by dispersing an ion-exchange layered silicate in a solvent and then bringing an organoaluminum compound in contact therewith. Alternatively, contacting may be carried out by adding an organoaluminum compound to a solvent and then dispersing an ion-exchange layered silicate therein.

The contacting treatment is carried out generally at a temperature of from −50° C. to a boiling point of a solvent, preferably from 0° C. to a boiling point of a solvent. The contacting time is from 1 minute to 48 hours, preferably from 1 minute to 24 hours.

The order of contacting an organoaluminum compound with an ion-exchange layered silicate is not specially limited as far as the object of the present invention is achieved, but it is more effective to carry out the contacting treatment after chemical treatment of the silicate or preferably after drying carried out after the chemical treatment.

Also, the order of contacting treatment step of an organoaluminum compound and an ion-exchange layered silicate and the granulation step of an ion-exchange layered silicate is not specially limited as far as the object of the present invention is achieved, but it is preferable to carry out the treatment with an organoaluminum compound after granulating the silicate.

Further, it is possible to enhance the effect of the present invention by combining the above-mentioned respective treatments. Thus, after controlling a particle size distribution and a carrier particle strength by granulating an ion-exchange layered silicate, a carrier obtained through the following Step 1 and Step 2 is used as a catalyst component for olefin polymerization.

Step 1: after granulating an ion-exchange layered silicate, the silicate is treated with an acid having an acid concentration as described above.

Step 2: after carrying out step 1, the silicate is treated with an organoaluminum compound which is any organoaluminum compound from the discussion above.

Methods of Making the Catalyst System

Any method of supporting the metallocene compound and activator may be used. In some embodiments of this invention, the "treated" support (i.e., the support has been contacted with the organoaluminum, preferably alkyl aluminum) is slurried in a non-polar solvent and the resulting slurry is contacted with a solution of catalyst(s). The slurry mixture may be heated to 0° C. to 70° C., preferably to 25° C. to 60° C., preferably at room temperature (25° C.). Contact times typically range from 0.5 hours to 24 hours, from 2 hours to 16 hours, or from 4 hours to 8 hours.

Suitable non-polar solvents are materials in which all of the reagents used herein, i.e., the activator, and the metallocene compound, are at least partially soluble and which are liquid at reaction temperatures. Preferred non-polar solvents are alkanes, such as isopentane, hexane, n-heptane, octane, nonane, and decane, although a variety of other materials including cycloalkanes, such as cyclohexane, aromatics, such as benzene, toluene, and ethylbenzene, alone or in combination, may also be employed.

In particular embodiments of the invention, where the activator is present, the support material is contacted with a solution of activator to form a supported activator.

The supported activator is then slurried into an appropriate solvent, preferably a non-polar solvent. Preferred non-polar solvents are alkanes, such as isopentane, hexane, n-heptane, octane, nonane, and decane, although a variety of other materials including cycloalkanes, such as cyclohexane, aromatics, such as benzene, toluene, and ethylbenzene, may also be employed. The metallocene compound is added to the slurry mixture and heated to a temperature in the range of from 0° C. to 70° C., preferably from 25° C. to 60° C., most preferably at 25° C. Contact times typically range from 0.5 hours to 24 hours, from 2 hours to 16 hours, or from 4 hours to 8 hours. The volatiles are removed to yield the supported catalyst system, preferably as a free-flowing solid.

In other embodiments, the metallocene compound is contacted with the activator in solution, preferably in a solution of non-polar solvent, such as those above. The solution may be heated to 0° C. to 70° C., preferably from 25° C. to 60° C., preferably at 25° C. Contact times may range from 0.5 hours to 24 hours, from 2 hours to 16 hours, or from 4 hours to 8 hours. The metallocene-activator solution is then contacted with the support material to form a slurry mixture. The slurry mixture may be heated to 0° C. to 70° C., preferably from 25° C. to 60° C., preferably at 25° C. Contact times may range from 0.5 hours to 24 hours, from 2 hours to 16 hours, or from 4 hours to 8 hours. The volatiles are removed, preferably under vacuum, to yield the supported catalyst system, preferably as a free-flowing solid.

In some embodiments, the weight ratio of the catalyst to the solid support material may be from 10:1 to 0.0001:1, from 1:1 to 0.001:1, or from 0.1:1 to 0.001:1. The weight ratio of the support material to the activator compound (such as an alumoxane) may range from 1:10 to 100:1, from 1:1 to 100:1, or from 1:1 to 10:1. The weight ratio of the support material to the organoaluminum compound (such as a trialkylaluminum) may range from 1:10 to 1:100, alternately from 1:1 to 100:1, or 1:1 to 10:1).

In some embodiments, the supported catalyst system is suspended in a paraffinic agent, such as mineral oil, for easy addition to a reactor system, for example, a gas phase polymerization system.

Polymerization Processes

This invention also relates to polymerization processes comprising: contacting one or more olefins with the metallocene catalyst system of the present invention under polymerization conditions; and obtaining an olefin polymer.

The metallocene catalyst systems described herein are useful in the polymerization of all types of olefins. This includes polymerization processes which produce homopolymers, copolymers, terpolymers, and the like, as well as block copolymers and impact copolymers.

Monomers useful herein include substituted or unsubstituted $C_2$ to $C_{40}$ olefins, preferably $C_2$ to $C_{20}$ olefins, preferably $C_2$ to $C_{12}$ olefins, preferably ethylene, propylene, butene, pentene, hexene, heptene, octene, nonene, decene, undecene, dodecene and isomers thereof, preferably alpha olefins. In a preferred embodiment of the invention, the monomer comprises propylene and optional comonomers comprising one or more ethylene or $C_4$ to $C_{40}$ olefins, preferably $C_4$ to $C_{20}$ olefins, or preferably $C_6$ to $C_{12}$ olefins. The $C_4$ to $C_{40}$ olefin monomers may be linear, branched, or cyclic. The $C_4$ to $C_{40}$ cyclic olefins may be strained or unstrained, monocyclic or polycyclic, and may optionally include heteroatoms and/or one or more functional groups. In another preferred embodiment, the monomer comprises ethylene and optional comonomers comprising one or more $C_3$ to $C_{40}$ olefins, preferably $C_4$ to $C_{20}$ olefins, or preferably $C_6$ to $C_{12}$ olefins. The $C_3$ to $C_{40}$ olefin monomers may be linear, branched, or cyclic. The $C_3$ to $C_{40}$ cyclic olefins may be strained or unstrained, monocyclic or polycyclic, and may optionally include heteroatoms and/or one or more functional groups.

Examples of $C_2$ to $C_{40}$ olefin monomers and optional comonomers include ethylene, propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, preferably hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives, preferably norbornene, norbornadiene, and dicyclopentadiene. Preferably, the polymerization or copolymerization is carried out using olefins such as ethylene, propylene, 1-butene, 1-hexene, 4-methyl-1-pentene, and 1-octene, vinylcyclohexane, norbornene, and norbornadiene. In particular, propylene and ethylene are polymerized.

In some embodiments, where butene is the comonomer, the butene source may be a mixed butene stream comprising various isomers of butene. The 1-butene monomers are expected to be preferentially consumed by the polymerization process. Use of such mixed butene streams will provide an economic benefit, as these mixed streams are often waste streams from refining processes, for example, $C_4$ raffinate streams, and can therefore be substantially less expensive than pure 1-butene.

Polymerization processes of this invention can be carried out in any manner known in the art, in slurry, in suspension or in the gas phase, continuously or batchwise, or any combination thereof, in one or more steps. Slurry, and gas phase processes are preferred. A bulk homogeneous process is also useful. (A bulk process is defined to be a process where monomer concentration in all feeds to the reactor is 70 vol % or more.) Alternately, no solvent or diluent is present or added in the reaction medium (except for the small amounts used as the carrier for the catalyst system or other additives, or amounts typically found with the monomer; e.g., propane in propylene). In another embodiment, the process is a slurry process. As used herein the term "slurry polymerization process" means a polymerization process where a supported catalyst is employed and monomers are polymerized on the supported catalyst particles and at least 95 wt % of polymer products derived from the supported catalyst are in granular form as solid particles (not dissolved in the diluent).

Gas Phase Polymerization

Generally, in a fluidized gas bed process used for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See for example, U.S. Pat. Nos. 4,543,399; 4,588,790; 5,028,670; 5,317,036; 5,352,749; 5,405,922; 5,436,304; 5,453,471; 5,462,999; 5,616,661; and 5,668,228; all of which are fully incorporated herein by reference.)

Slurry Phase Polymerization

A slurry polymerization process generally operates between 1 to about 50 atmosphere pressure range (15 psi to 735 psi, 103 kPa to 5068 kPa) or even greater and temperatures in the range of 0° C. to about 120° C. In a slurry polymerization, a suspension of solid, particulate polymer is formed in a liquid polymerization diluent medium to which monomer and comonomers along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used the process must be operated above the reaction diluent critical temperature and pressure. Preferably, a hexane or an isobutane medium is employed.

In an embodiment, a preferred polymerization technique useful in the invention is referred to as a particle form polymerization, or a slurry process where the temperature is kept below the temperature at which the polymer goes into solution. Such technique is well known in the art, and described in, for instance, U.S. Pat. No. 3,248,179 which is fully incorporated herein by reference. The preferred temperature in the particle form process is within the range of about 85° C. to about 110° C. Two preferred polymerization methods for the slurry process are those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484; which is fully incorporated herein by reference.

In another embodiment, the slurry process is carried out continuously in a loop reactor. The catalyst, as a slurry in isobutane or as a dry free flowing powder, is injected regularly to the reactor loop, which is itself filled with circulating slurry of growing polymer particles in a diluent of isobutane containing monomer and comonomer. Hydrogen, optionally, may be added as a molecular weight control. (In one embodiment 500 ppm or less of hydrogen is added, or 400 ppm or less or 300 ppm or less. In other embodiments at least 50 ppm of hydrogen is added, or 100 ppm or more, or 150 ppm or more.)

The reactor may be maintained at a pressure of 3620 kPa to 4309 kPa and at a temperature in the range of about 60° C. to about 104° C. depending on the desired polymer melting characteristics. Reaction heat is removed through the loop wall since much of the reactor is in the form of a double-jacketed pipe. The slurry is allowed to exit the reactor at regular intervals or continuously to a heated low pressure flash vessel, rotary dryer and a nitrogen purge column in sequence for removal of the isobutane diluent and all unreacted monomer and comonomers. The resulting hydrocarbon free powder is then compounded for use in various applications.

Other additives may also be used in the polymerization, as desired, such as one or more scavengers, promoters, modifiers, chain transfer agents (such as diethyl zinc), reducing agents, oxidizing agents, hydrogen, aluminum alkyls, or silanes.

Useful chain transfer agents are typically alkylalumoxanes, a compound represented by the formula $AlR_3$, $ZnR_2$ (where each R is, independently, a $C_1$-$C_8$ aliphatic radical, preferably methyl, ethyl, propyl, butyl, pentyl, hexyl octyl or an isomer thereof) or a combination thereof, such as diethyl zinc, methylalumoxane, trimethylaluminum, triisobutylaluminum, trioctylaluminum, or a combination thereof.

Preferred polymerizations can be run at any temperature and/or pressure suitable to obtain the desired polymers. Typical temperatures and/or pressures include a temperature greater than 30° C., preferably greater than 50° C., preferably greater than 65° C., alternately less than 200° C., preferably less than 150° C., most preferably less than 140° C., and at a pressure in the range of from 0.35 MPa to 10 MPa, preferably from 0.45 MPa to 6 MPa, or preferably from 0.5 MPa to 4 MPa.

In a typical polymerization, the run time of the reaction is up to 300 minutes, preferably in the range of from 5 to 250 minutes, or preferably from 10 to 120 minutes.

If necessary, hydrogen is added as a molecular-weight regulator and/or in order to increase the activity. The overall pressure in the polymerization system usually is at least 0.5 bar, preferably at least 2 bar, most preferably at least 5 bar. Pressures higher than 100 bar, e.g., higher than 80 bar and, in particular, higher than 64 bar, are usually not preferred. In some embodiments, hydrogen is present in the polymerization reactor at a partial pressure of from 0.001 to 100 psig (0.007 to 690 kPa), preferably from 0.001 to 50 psig (0.007 to 345 kPa), preferably from 0.01 to 25 psig (0.07 to 172 kPa), more preferably 0.1 to 10 psig (0.7 to 70 kPa).

In an alternate embodiment, the productivity of the catalyst is at least 50 gpolymer/g (cat)/hour, preferably 500 or more gpolymer/g (cat)/hour, preferably 5000 or more gpolymer/g (cat)/hour, preferably 50,000 or more gpolymer/g (cat)/hour.

In an alternate embodiment, the conversion of olefin monomer is at least 10%, based upon polymer yield and the weight of the monomer entering the reaction zone, preferably 20% or more, preferably 30% or more, preferably 50% or more, preferably 80% or more. A "reaction zone", also referred to as a "polymerization zone", is a vessel where polymerization takes place, for example, a batch reactor. When multiple reactors are used in either series or parallel configuration, each reactor is considered as a separate polymerization zone. For a multi-stage polymerization in both a batch reactor and a continuous reactor, each polymerization stage is considered as a separate polymerization zone. In preferred embodiments, the polymerization occurs in one, two, three, four, or more reaction zones.

In a preferred embodiment, the catalyst system used in the polymerization comprises no more than one catalyst compound.

Other additives may also be used in the polymerization, as desired, such as one or more scavengers, promoters, modifiers, chain transfer agents (such as diethyl zinc), reducing agents, oxidizing agents, hydrogen, aluminum alkyls, or silanes.

Polyolefin Products

This invention also relates to polyolefins produced using the metallocene catalyst systems of this invention, particularly propylene and ethylene homopolymers and copolymers. In some embodiments, the invention relates to polyolefins produced using the metallocene catalyst systems of this invention, particularly polyethylene, having a density in the range of 0.88 to 0.940 g/cc, preferably in the range of from 0.90 to 0.940 g/cc, preferably 0.910 to 0.935 g/cc, preferably 0.915 to 0.935 g/cc, preferably 0.920 to 0.935 g/cc.

In a preferred embodiment, the process described herein produces propylene homopolymers or propylene copolymers, such as propylene-ethylene and/or propylene-α-olefin (preferably $C_2$, and/or $C_4$ to $C_{20}$) copolymers (such as propylene-hexene copolymers, propylene-octene copolymers, or propylene-ethylene-hexene terpolymers) having a Mw/Mn of greater than 1 to 40 (preferably greater than 1 to 5). Preferably, copolymers of propylene have from 0 wt % to 25 wt % (alternately from 0.5 wt % to 20 wt %, alternately from 1 wt % to 15 wt %, preferably from 3 wt % to 10 wt %, preferably less than 1 wt %, preferably 0 wt %) of one or more of $C_2$ or $C_4$ to $C_{40}$ olefin comonomer (preferably ethylene or $C_4$ to $C_{20}$ or $C_4$ to $C_{12}$ alpha olefin comonomer, preferably ethylene, butene, hexene, octene, decene, dodecene, preferably ethylene, butene, hexene, or octene).

In another preferred embodiment, the process described herein produces ethylene homopolymers or copolymers, such as ethylene-propylene and/or ethylene-α-olefin (preferably $C_3$ and/or $C_4$ to $C_{20}$) copolymers (such as ethylene-hexene copolymers, ethylene-octene copolymers, ethylene-butene copolymers, or ethylene-propylene-hexene terpolymers) having a Mw/Mn of greater than 1 to 40 (preferably greater than 1 to 5). Preferably, copolymers of ethylene have from 0 wt % to 25 wt % (alternately from 0.5 wt % to 20 wt %, alternately from 1 wt % to 15 wt %, preferably from 3 wt % to 10 wt %, preferably less than 1 wt %, preferably 0 wt %) of one or more of $C_3$ to $C_{40}$ olefin comonomer (preferably propylene or $C_3$ to $C_{20}$ or $C_4$ to $C_{12}$ alpha olefin comonomer, preferably propylene, butene, hexene, octene, decene, dodecene, preferably butene, hexene, and octene).

In a preferred embodiment, the monomer is ethylene and the comonomer is hexene, preferably from 1 to 15 mol % hexene, alternately 1 to 10 mol %.

Typically, the polymers produced herein have an Mw of 5,000 to 1,000,000 g/mol (preferably 25,000 to 750,000 g/mol, preferably 50,000 to 500,000 g/mol).

Typically, the polymers produced herein have an Mw/Mn of greater than 1 to 40 (alternately 1.2 to 20, alternately 1.3 to 10, alternately 1.4 to 5, alternately 1.5 to 4, alternately 1.5 to 3).

Typically, the polymers produced herein have an Mw of 5,000 to 1,000,000 g/mol (preferably 25,000 to 750,000 g/mol, preferably 50,000 to 500,000 g/mol), and an Mw/Mn of greater than 1 to 20 (alternately 1.2 to 15, alternately 1.3 to 10, alternately 1.4 to 5, alternately 1.5 to 4, alternately 1.5 to 3).

In a preferred embodiment the polymer produced herein has a unimodal or multimodal molecular weight distribution as determined by Gel Permeation Chromotography (GPC). By "unimodal" is meant that the GPC trace has one peak or inflection point. By "multimodal" is meant that the GPC trace has at least two peaks or inflection points. An inflection point is that point where the second derivative of the curve changes in sign (e.g., from negative to positive or vice versa).

Unless otherwise indicated Mw, Mn, MWD (Mw/Mn) are determined by GPC as described the Experimental section below.

In a preferred embodiment, the polymer produced herein has a composition distribution breadth index (CDBI) of 50% or more, preferably 60% or more, preferably 70% or more, preferably 80% or more. CDBI is a measure of the composition distribution of monomer within the polymer chains and is measured by the procedure described in PCT publication WO 93/03093, published Feb. 18, 1993, specifically columns 7 and 8 as well as in Wild et al, J. Poly. Sci., Poly. Phys. Ed., Vol. 20, p. 441 (1982) and U.S. Pat. No. 5,008,204, including that fractions having a weight average molecular weight (Mw) below 15,000 are ignored when determining CDBI.

In another embodiment, the polymer produced herein has two peaks in the TREF measurement. Two peaks in the TREF measurement as used in this specification and the appended claims means the presence of two distinct normalized ELS (evaporation mass light scattering) response peaks in a graph of normalized ELS response (vertical or y axis) versus elution temperature (horizontal or x axis with temperature increasing from left to right) using the TREF method below. A "peak" in this context means where the general slope of the graph changes from positive to negative with increasing temperature. Between the two peaks is a local minimum in which the general slope of the graph changes from negative to positive with increasing temperature. "General trend" of the graph is intended to exclude the multiple local minimums and maximums that can occur in intervals of 2° C. or less. Preferably, the two distinct peaks are at least 3° C. apart, more preferably at least 4° C. apart, even more preferably at least 5° C. apart. Additionally, both of the distinct peaks occur at a temperature on the graph above 20° C. and below 120° C. where the elution temperature is run to 0° C. or lower. This limitation avoids confusion with the apparent peak on the graph at low temperature caused by material that remains soluble at the lowest elution temperature. Two peaks on such a graph indicates a bi-modal composition distribution (CD). Bimodal CD may also be determined by other methods known to those skilled in the art. One such alternate method for TREF measurement that can be used if the above method does not show two peaks is disclosed in B. Monrabal, "Crystallization Analysis Fractionation: A New Technique for the Analysis of Branching Distribution in Polyolefins," Journal of Applied Polymer Science, Vol. 52, 491-499 (1994).

TREF Method

Figure 3A:
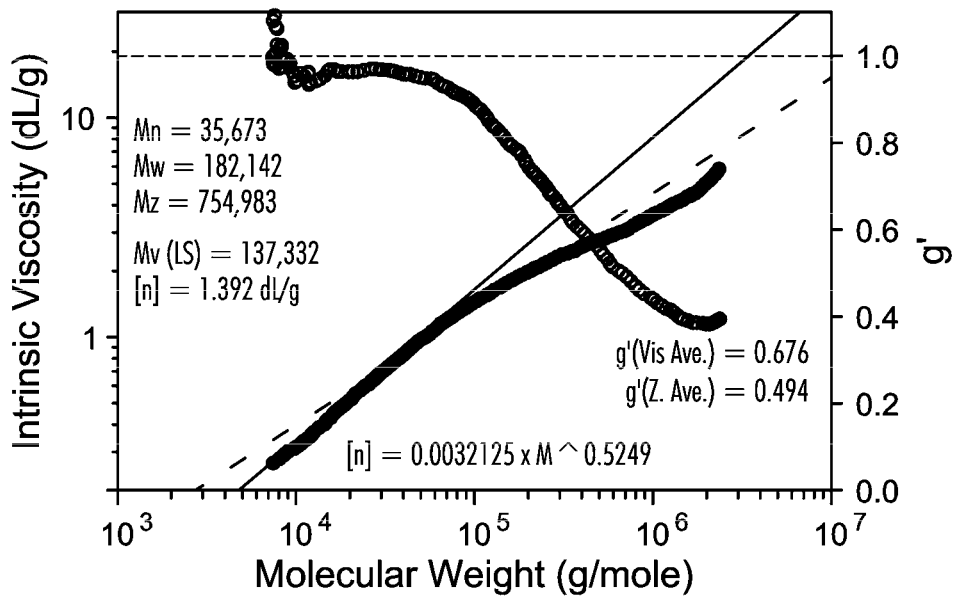
Figure 3A:
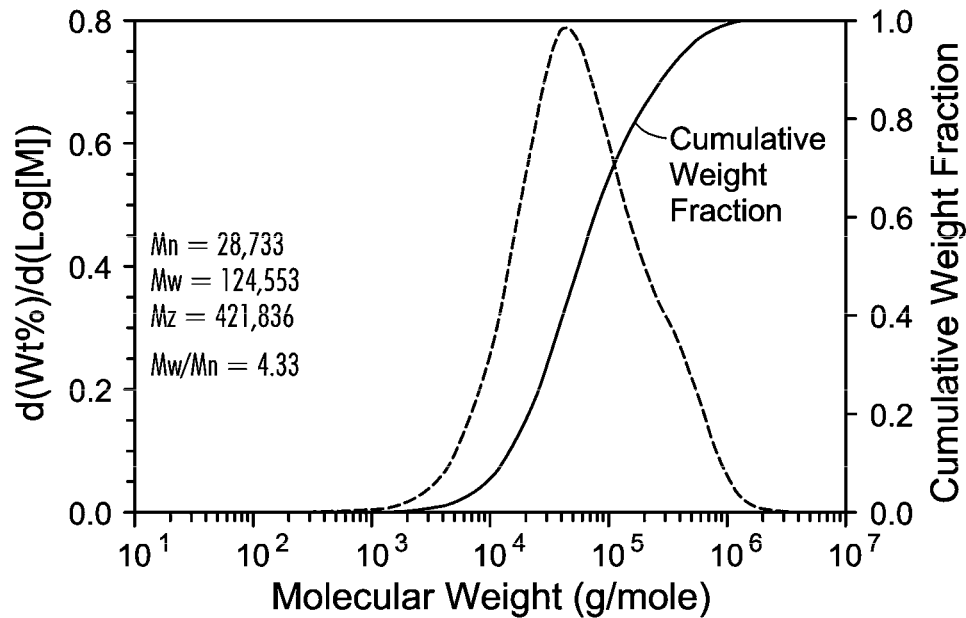

Temperature Rising Elution Fractionation (TREF) analysis is done using a CRYSTAF-TREF 200+ instrument from Polymer Char, S. A., Valencia, Spain. The principles of TREF analysis and a general description of the particular apparatus to be used are given in the article Monrabal, B.; del Hierro, P. Anal. Bioanal. Chem., 2011, 399, 1557. FIG. 3 of the article is an appropriate schematic of the particular apparatus used; however, the connections to the 6-port valve shown in FIG. 3 differ from the apparatus to be used in that the tubing connected to the 11-o'clock port is connected to the 9-o'clock port and the tubing connected to the 9-o'clock port is connected to the 11-o'clock port. Pertinent details of the analysis method and features of the apparatus to be used are as follows.

1,2-Dichlorobenzene (ODCB) solvent stabilized with approximately 380 ppm of 2,6-bis(1,1-dimethylethyl)-4-methylphenol (butylated hydroxytoluene) is used for preparing the sample solution and for elution. The sample to be analyzed (approximately 25 mg, but as low as approximately 10 mg) is dissolved in ODCB (25 ml metered at ambient temperature) by stirring at 150° C. for 60 min. A small volume (0.5 ml) of the solution is introduced into a column (15-cm long by ⅜" o.d.) packed with an inert support (of stainless steel balls) at 150° C., and the column temperature is stabilized at 140° C. for 45 min. The sample volume is then allowed to crystallize in the column by reducing the temperature to 30° C. at a cooling rate of 1° C./min. The column is kept at 30° C. for 15 min before injecting the ODCB flow (1 ml/min) into the column for 10 min to elute and measure the polymer that did not crystallize (soluble fraction). The infrared detector used (Polymer Char IR4) generates an absorbance signal that is proportional to the concentration of polymer in the eluting flow. A complete TREF curve is then generated by increasing the temperature of the column from 30 to 140 C at a rate of 2° C./min while maintaining the ODCB flow at 1 ml/min to elute and measure the dissolving polymer.

In a preferred embodiment of the invention, the polymer produced herein has a branching index (g' (vis ave)) of 0.90 or more, preferably 0.95 or more, preferably 0.98 or more.

In a preferred embodiment of the invention, the polymer produced herein has a branching index (g'(z ave)) of 0.50 or more, preferably 0.70 or more, preferably 0.80 or more.

In a preferred embodiment of the invention, the polymer produced herein has a branching index (g' (vis ave)) of 0.90 or more, preferably 0.95 or more, preferably 0.98 or more and a branching index (g'(z ave)) of 0.50 or more, preferably 0.70 or more, preferably 0.80 or more.

In an alternate embodiment of the invention, the polymer produced herein has a branching index (g' (vis ave)) of 0.90 or more, preferably 0.95 or more, preferably 0.98 or more and a branching index (g'(z ave)) of 0.90 or more, preferably 0.95 or more.

In an alternate embodiment of the invention, the polymer produced herein has a branching index (g' (vis ave)) that is less than the branching index (g'(z ave)).

In a preferred embodiment of the invention, the polymer produced herein has a bimodal composition distribution and a branching index (g' (vis ave)) of 0.90 or more, preferably 0.95 or more, preferably 0.98 or more.

In an alternate embodiment of the invention, the polymer produced herein has a Melt Index (MI) of 0.1 dg/min or more, typically from 0.5 to 30 dg/min. Melt Index (MI, also referred to as I2) is determined according to ASTM D1238 at 190° C., under a load of 2.16 kg unless otherwise noted.

High Load Melt Index (HLMI, also referred to as I21) is the melt flow rate measured according to ASTM D-1238 at 190° C., under a load of 21.6 kg. The units for HLMI are g/10 min or dg/min.

In an alternate embodiment of the invention, the polymer produced herein has a Melt Index Ratio of 30 or less, preferably from 1 to 30, alternately 2 to 25, alternately 5 to 20. Melt Index Ratio (MIR) is the ratio of the high load melt index to the melt index, or I21/I2, as determined by AST 1238.

Uses of Polyolefins

Polyolefins prepared using the processes described herein find uses in all applications including fibers, injection molded parts, films, pipes, and wire and cable applications. Examples include carpet fibers and primary and secondary carpet backing; slit tape applications such as tarpaulins, erosion abatement screens, sand bags, fertilizer and feed bags, swimming pool covers, intermediate bulk container (IBC) bags; non-woven applications for spun-bonded, melt blown and thermobonded fibers; carded web applications such as disposable diaper liners, feminine hygiene products, tarpaulins and tent fabrics, and hospital garments; apparel applications such as socks, T-shirts, undergarments, bicycle shorts, sweat bands, football undershirts, hiking socks, and other outdoor sporting apparel; cordage applications such as mooring and towing lines and rope; netting applications such as safety fences and geogrids for soil stabilization; injection molded applications such as appliance parts in automatic dishwashers and clothes washers, hand tools, and kitchen appliances; consumer product applications such as outdoor furniture, luggage, infant car seats, ice coolers, yard equipment; medical applications such as disposable syringes and other hospital and laboratory devices; rigid packaging made by injection molding, blow molding, or thermoforming such as margarine tubs, yogurt containers and closures, commercial bottles, and ready-to-eat food containers; transportation applications such as automotive interior trim, instrument panels, bumper fascia, grills and external trim parts, battery cases; film applications such as snack packages and other food packaging and film labels, packing tapes and pressure sensitive labels; wire and cable applications such as wire insulation.

The polyolefins described herein may be used by themselves or blended with one or more additional polymers. In another embodiment, the polyolefin (preferably propylene or ethylene homopolymer or copolymer) produced herein is combined with one or more additional polymers prior to being formed into a film, molded part, or other article. Useful additional polymers include polyethylene, isotactic polypropylene, highly isotactic polypropylene, syndiotactic polypropylene, random copolymer of propylene and ethylene, and/or butene, and/or hexene, polybutene, ethylene vinyl acetate, LDPE (low density polyethylene), LLDPE (linear low density polyethylene), HDPE (high density polyethylene), ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM (ethylene-propylene-diene monomer rubber), block copolymer, styrenic block copolymers, polyamides, polycarbonates, PET (polyethylene terephthalate) resins, cross linked polyethylene, copolymers of ethylene and vinyl alcohol (EVOH), polymers of aromatic monomers such as polystyrene, poly-1 esters, polyacetal, polyvinylidine fluoride, polyethylene glycols, and/or polyisobutylene.

This invention further relates to:

1. A process to polymerize olefins comprising:
i) contacting one or more olefins with a catalyst system comprising: 1) optionally, an activator, 2) an organoaluminum treated layered silicate support, and 3) bridged metallocene compound represented by the formula:

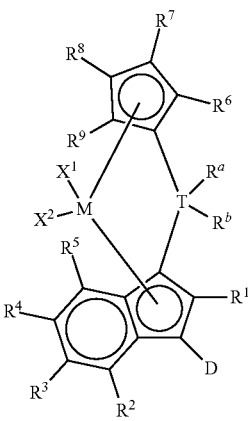

wherein: M is a group 4 metal; T is a group 14 atom; D is a hydrogen, halide, alkoxide or a $C_1$ to $C_{40}$ substituted or unsubstituted hydrocarbyl group; $R^a$ and $R^b$ are independently, hydrogen, halogen, or a $C_1$ to $C_{20}$ substituted or unsubstituted hydrocarbyl, and $R^a$ and $R^b$ can form a cyclic structure including substituted or unsubstituted aromatic, partially saturated, or saturated cyclic or fused ring system; each $X^1$ and $X^2$ is independently selected from the group consisting of $C_1$ to $C_{20}$ substituted or unsubstituted hydrocarbyl groups, hydrides, amides, amines, alkoxides, sulfides, phosphides, halides, dienes, phosphines, and ethers; and $X^1$ and $X^2$ can form a cyclic structure including aromatic, partially saturated, or saturated cyclic or fused ring system; each of $R^1$, $R^2$, $R^3$, $R^4$, and $R^5$ is, independently, hydrogen, halide, alkoxide or a $C_1$ to $C_{40}$ substituted or unsubstituted hydrocarbyl group, and any of adjacent $R^2$, $R^3$, $R^4$, and/or $R^5$ groups may form a fused ring or multicenter fused ring systems, where the rings may be substituted or unsubstituted, and may be aromatic, partially unsaturated, or unsaturated; and each of $R^6$, $R^7$, $R^8$, and $R^9$ is, each independently, hydrogen or a $C_1$ to $C_{40}$ substituted or unsubstituted hydrocarbyl group;

ii) obtaining polyolefin having a g'(vis) of 0.90 or more and an MIR of 30 or less.

2. The process of paragraph 1, wherein M is zirconium or hafnium.

3. The process of paragraph 1 or 2, wherein D is a substituted or unsubstituted aromatic group at least two of $R^6$, $R^7$, $R^8$, and $R^9$ are $C_1$ to $C_{40}$ substituted or unsubstituted hydrocarbyl groups.

4. The process of paragraph 1, 2, or 3, wherein D is selected from the group consisting of substituted or unsubstituted phenyl, naphthyl, biphenyl, cyclopropentyl, tropylium, cyclooctatetraenyl, furanyl, pyridinyl, borabenzyl, thiophenyl, azolyl, oxazolyl, and imidazolyl.

5. The process of any of paragraphs 1 to 4, wherein T is silicon or germanium.

6. The process of any of paragraphs 1 to 5, wherein each $R^a$ and $R^b$ is independently selected from the group consisting of halides, $C_1$ to $C_{20}$ substituted or unsubstituted hydrocarbyl groups, and cyclic structures where $R^a$ and $R^b$ form a heterocyclopentyl, heterocyclobutyl, or heterocyclohexyl structure with T being the heteroatom.

7. The process of any of paragraphs 1 to 6, wherein each $X^1$ and $X^2$ is independently selected from the group consisting of halides and $C_1$ to $C_{20}$ substituted or unsubstituted hydrocarbyl groups.

8. The process of any of paragraphs 1 to 7, wherein each of $R^1$, $R^2$, $R^3$, $R^4$, $R^5$, $R^6$, $R^7$, $R^8$, and $R^9$ is, independently, hydrogen or a $C_1$ to $C_{20}$ substituted or unsubstituted hydrocarbyl group.

9. The process of any of paragraphs 1 to 8, wherein each of $R^6$, $R^7$, $R^8$, and $R^9$ is, independently, a $C_1$ to $C_{40}$ substituted or unsubstituted hydrocarbyl group.

10. The process of paragraph 9, wherein each of $R^6$, $R^7$, $R^8$, and $R^9$ is, independently, selected from the group consisting of methyl, ethyl, propyl, isopropyl, n-butyl, sec-butyl, t-butyl, pentyl, hexyl, heptyl, octyl, decyl, and undecyl groups.

11. The process of paragraph 9, wherein each of $R^6$, $R^7$, $R^8$, and $R^9$ is, independently, a methyl group, an ethyl group, or an n-propyl group.

12. The process of paragraph 9, wherein adjacent $R^6$, $R^7$, $R^8$, and/or $R^9$ groups fuse together with the cyclopentadienyl group to form a substituted or unsubstituted fluorene.

13. The process of any of paragraphs 1 to 12, where the organoaluminum compound is represented by the formula:

$$AlR_3 \text{ or } AlR^*_n Y_{3-n}$$

wherein each R is independently a substituted or unsubstituted alkyl group and/or a substituted or unsubstituted aryl group, R* is a hydrocarbon group having a carbon number of from 1 to 30, Y is hydrogen, halogen, an alkoxy group or a siloxy group, and n is 1, 2, or 3.

14. The process of any of paragraphs 1 to 13, where the organoaluminum compound comprises trimethylaluminum, triethylaluminum, triisobutylaluminum, tri-n-hexylaluminum, tri-n-octylaluminum, tri-iso-octylaluminum, triphenylaluminum or combinations thereof.

15. The process of any of paragraphs 1 to 14, wherein the organoaluminum compound comprises 0 to 20 wt % alkyl alumoxane, based upon the weight of the organoaluminum compounds on the support.

16. The process of any of paragraphs 1 to 14, wherein the organoaluminum compound comprises 0 wt % alkyl alumoxane.

17. The process of any of paragraphs 1 to 16, wherein the support is treated with triethylaluminum, triisobutylaluminum, trimethylaluminum, tri-n-octylaluminum.

18. The process of any of paragraphs 1 to 17, wherein the support comprises montmorillonite, nontronite, beidellite, volkonskoite, laponite, hectorite, saponite, sauconite, stevensite, vermiculite, halloysite, aluminate oxides, bentonite, kaolinite, dickite, smectic clays, mica, magadiite, kenyaite, octosilicate, kanemite, makatite, attapulgite, sepiolite, zeolitic layered materials, and mixtures thereof.

19. The process of any of paragraphs 1 to 18, wherein the support is acidified by contacting with an acid prior to treatment with the organoaluminum compound.

20. The process of any of paragraphs 1 to 18, wherein the support is contacted with a Bronsted acid prior to treatment with the organoaluminum compound.

21. The process of any of paragraphs 1 to 20, wherein the support is montmorillonite.

22. The process of any of paragraphs 1 to 21, wherein the polyolefin is an ethylene polymer.

23. The process of any of paragraphs 1 to 22, wherein the polyolefin is an ethylene polymer having a bimodal composition distribution and a g'vis of 0.95 or more.

24. The process of any of paragraphs 1 to 22, wherein the polyolefin has a bimodal Mw/Mn, a bimodal composition distribution and a g'vis of 0.95 or more.

25. The process of any of paragraphs 1 to 24, wherein the polymerization is conducted in the gas phase.

26. The process of any of paragraphs 1 to 24, wherein the polymerization is conducted in the slurry phase.

27. The process of any of paragraphs 1 to 26, wherein the polyolefin has:
   1) an Mw of 25,000 to 1,000,000 g/mol;
   2) an Mw/Mn of from 1 to 10;
   3) an MI of 0.1 dg/min or more;
   4) a bimodal composition distribution; and
   5) a g'(zave) of 0.50 or more;

28. The process of any of paragraphs 1 to 27, wherein the organoaluminum compound is present at from 0.01 to 1000 mmol per 1 g of support.

EXAMPLES

The following abbreviations may be used below: eq. means equivalents.

All reagents were obtained from Sigma Aldrich (St. Louis, Mo.) and used as obtained, unless stated otherwise. All solvents were anhydrous. All reactions were performed under an inert nitrogen atmosphere, unless otherwise stated. All deuterated solvents were obtained from Cambridge Isotopes (Cambridge, Mass.) and dried over 3 Angstrom molecular sieves before use.

Room Temperature (RT) is 25° C. unless otherwise indicated.

Products were characterized as follows:

$^1$H NMR.

$^1$H NMR data was collected at room temperature in a 5 mm probe using a Varian spectrometer with a $^1$H frequency of at least 400 MHz. Data was recorded using a maximum pulse width of 45° C., 8 seconds between pulses and signal averaging 120 transients.

Gel Permeation Chromotography with Three Detectors (GPC-3D)

Mw, Mn, and Mw/Mn are determined by using a High Temperature Gel Permeation Chromatography (Agilent PL-220), equipped with three in-line detectors, a differential refractive index detector (DRI), a light scattering (LS) detector, and a viscometer. Experimental details, including detector calibration, are described in: T. Sun, P. Brant, R. R. Chance, and W. W. Graessley, Macromolecules, Volume 34, Number 19, pp. 6812-6820, (2001) and references therein. Three Agilent PLgel 10 μm Mixed-B LS columns are used. The nominal flow rate is 0.5 mL/min, and the nominal injection volume is 300 μL. The various transfer lines, columns, viscometer and differential refractometer (the DRI detector) are contained in an oven maintained at 145° C. Solvent for the experiment is prepared by dissolving 6 grams of butylated hydroxytoluene as an antioxidant in 4 liters of Aldrich reagent grade 1,2,4-trichlorobenzene (TCB). The TCB mixture is then filtered through a 0.1 μm Teflon filter. The TCB is then degassed with an online degasser before entering the GPC-3D. Polymer solutions are prepared by placing dry polymer in a glass container, adding the desired amount of TCB, then heating the mixture at 160° C. with continuous shaking for about 2 hours. All quantities are measured gravimetrically. The TCB densities used to express the polymer concentration in mass/volume units are 1.463 g/ml at room temperature and 1.284 g/ml at 145° C. The injection concentration is from 0.5 to 2.0 mg/ml, with lower concentrations being used for higher molecular weight samples. Prior to running each sample the DRI detector and the viscometer are purged. Flow rate in the apparatus is then increased to 0.5 ml/minute, and the DRI is allowed to stabilize for 8 hours before injecting the first sample. The LS laser is turned on at least 1 to 1.5 hours before running the samples. The concentration, c, at each point in the chromatogram is calculated from the baseline-subtracted DRI signal, $I_{DRI}$, using the following equation:

$$c = K_{DRI} I_{DRI} / (dn/dc)$$

where $K_{DRI}$ is a constant determined by calibrating the DRI, and (dn/dc) is the refractive index increment for the system. The refractive index, n=1.500 for TCB at 145° C. and λ=690 nm. Units on parameters throughout this description of the GPC-3D method are such that concentration is expressed in g/cm$^3$, molecular weight is expressed in g/mole, and intrinsic viscosity is expressed in dL/g.

The LS detector is a Wyatt Technology High Temperature DAWN HELEOS. The molecular weight, M, at each point in the chromatogram is determined by analyzing the LS output using the Zimm model for static light scattering (M. B. Huglin, LIGHT SCATTERING FROM POLYMER SOLUTIONS, Academic Press, 1971):

$$\frac{K_0 c}{\Delta R(\theta)} = \frac{1}{MP(\theta)} + 2A_2 c$$

Here, $\Delta R(\theta)$ is the measured excess Rayleigh scattering intensity at scattering angle θ, c is the polymer concentration determined from the DRI analysis, $A_2$ is the second virial coefficient. $P(\theta)$ is the form factor for a monodisperse random coil, and $K_O$ is the optical constant for the system:

$$K_0 \frac{4\pi^2 n^2 (dn/dc)^2}{\lambda^4 N_A}$$

where $N_A$ is Avogadro's number, and (dn/dc) is the refractive index increment for the system, which take the same value as the one obtained from DRI method. The refractive index, n=1.500 for TCB at 145° C. and λ=657 nm.

A high temperature Viscotek Corporation viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_S$, for the solution flowing through the viscometer is calculated from their outputs. The intrinsic viscosity, $[\eta]$, at each point in the chromatogram is calculated from the following equation:

$$\eta_S = c[\eta] + 0.3(c[\eta])^2$$

where c is concentration and was determined from the DRI output.

The branching index ($g'_{vis}$) is calculated using the output of the GPC-DRI-LS-VIS method as follows. The average intrinsic viscosity, $[\eta]_{avg}$, of the sample is calculated by:

$$[\eta]_{avg} = \frac{\sum c_i [\eta]_i}{\sum c_i}$$

where the summations are over the chromatographic slices, i, between the integration limits.

The branching index $g'_{vis}$ is defined as:

$$g'vis = \frac{[\eta]_{avg}}{k M_v^\alpha}$$

where, for purpose of this invention and claims thereto, α=0.695 for ethylene, propylene, and butene polymers; and k=0.000579 for ethylene polymers, k=0.000262 for propylene polymers, and k=0.000181 for butene polymers and $M_V$ is the viscosity-average molecular weight based on molecular weights determined by LS analysis. For ethylene copolymers, k decreases with increasing comonomer content. Z average branching index ($g'z_{ave}$) is calculated using Ci=polymer concentration in the slice i in the polymer peak times the mass of the slice squared, $Mi^2$.

Experimental and analysis details not described above, including how the detectors are calibrated and how to calculate the composition dependence of Mark-Houwink parameters and the second-virial coefficient, are described by T. Sun, P. Brant, R. R. Chance, and W. W. Graessley (*Macromolecules*, 2001, Vol. 34(19), pp. 6812-6820).

All molecular weights are weight average unless otherwise noted. All molecular weights are reported in g/mol unless otherwise noted.

Melt Index (MI, also referred to as I2) is measured according to ASTM D1238 at 190° C., under a load of 2.16 kg unless otherwise noted. The units for MI are g/10 min or dg/min.

High Load Melt Index (HLMI, also referred to as I21) is the melt flow rate measured according to ASTM D-1238 at 190° C., under a load of 21.6 kg. The units for HLMI are g/10 min or dg/min.

Melt Index Ratio (MIR) is the ratio of the high load melt index to the melt index, or I21/I2.

Density is measured by density-gradient column, as described in ASTM D1505, on a compression-molded specimen that has been slowly cooled to room temperature (i.e., over a period of 10 minutes or more) and allowed to age for a sufficient time that the density is constant within +/−0.001 $g/cm^3$. The units for density are $g/cm^3$.

Bulk Density is determined as follows: the resin is poured via a 1" diameter funnel into a fixed volume cylinder of 400 cc; the bulk density is measured as the weight of resin in the cylinder divided by the 400 cc to give a value in g/cc.

Metallocene 1:
Dimethylsilylene(2,3,4,5-tetramethyl-1-cyclopentadienyl)(3-phenyl-1-indenyl)zirconium dichloride was prepared as described in U.S. Ser. No. 14/090,585, filed Nov. 26, 2013, published as US 2014/0179884.

Silica Supported Metallocene 1: Supported dimethylsilylene(2,3,4,5-tetramethyl-1-cyclopentadienyl)(3-phenyl-1-indenyl)zirconium dichloride was prepared as follows: 30 wt % MAO in toluene (Albemarle, Baton Rouge, La., 6.25 g, 32.3 mmol, 120 eq.) and toluene (6.50 g) were combined and stirred for 15 minutes to give a clear solution. To this MAO solution was added dimethylsilylene(2,3,4,5-tetramethyl-1-cyclopentadienyl)(3-phenyl-1-indenyl)zirconium dichloride (Metallocene I, 0.147 g, 0.27 mmol, 1.00 eq.). The reaction was stirred for 15 minutes and then DAVISON™ 948 silica (5.00 g, dried at 600° C. for 16 hours) was added. The slurry was mixed for 10 minutes and then dried under vacuum for 22 hours. Yield 6.87 g (98%).

Metallocene 2:
Synthesis of dimethylsilylene(2,3,4,5-tetramethyl-1-cyclopentadienyl)(3-phenyl-1-indenyl)zirconium dimethyl was performed as follows:

In a 100 mL round bottom flask dimethylsilylene(2,3,4,5-tetramethyl-1-cyclopentadienyl)(3-phenyl-1-indenyl)zirconium dichloride (0.746 g, 1.41 mmol) was placed. 15 mL of toluene and 30 mL of diethyl ether were added to the flask. Methylmagnesium bromide (0.99 mL of 3.0M solution in diethyl ether, 2.97 mmol, 2.11 eq) was added to the mixture and stirred for 2 hr. After 4 hours, an additional 0.1 mL of methylmagnesium bromide and 5 mL of dichoromethane was added. After 1 hr $^1$H NMR analysis showed product. The reactions was stirred for another 30 minutes after which solvent was removed. The solids were redissolved in dichoromethane and filtered to remove inorganic solvents. The filtrate was dried under vacuum. Obtained 0.4578 grams of product (66.3%).

1H NMR (CD2Cl2) −1.75 (s, 3H), −0.95 (s, 3H), 0.78 (s, 3H), 1.00 (s, 3H), 1.79 (s, 3H), 1.87 (s, 3H), 1.91 (s, 6H), 5.94 (s, 1H), 7.04 (m, 1H), 7.40 (m, 2H), 7.48 (m, 3H), 7.66 (d, 2H), 8.08 (d, 1H).

Metallocene 3:
synthesis of dimethylsilylene(cyclopentadienyl)(indenyl)zirconium dimethyl was performed as follows:

Lithium indenide (2.92 g, 23.9 mmol) was dissolved in 100 mL of THF. A THF solution of $Me_4CpSiMe_2Cl$ (5.14 g, 23.9 mmol) was added to the solution. The solution was allowed to stir overnight. The reaction was then blown down, taken up in pentane and filtered through Celite™. The filtrate was then dried under vacuum to give 6.78 g of oil that was immediately taken to the next step.

The above oil (6.78 grams) was dissolved in diethyl ether and chilled to −35° C. "BuLi (20.3 mL, 2.5M, 50.75 mmol) was added dropwise, the solution was allowed to stir over the weekend. The solution was blown down and vacuum dried to remove the ether. The solid was washed with pentane and dried under vacuum to give 2.7859 g of solid with roughly 0.75 eq of ether still attached. 33.94% yield. NMR (THF-d8) δ 0.549 (s, br, 6H), 1.111 (t, 4.61H, ether), 1.895 (s, br, 6H), 2.103 (s, br, 6H), 3.381 (q, 3H, ether), 5.998 (m, 1H), 6.439 (m, br, 2H), 6.764 (d, 1H), 7.306 (d, br, 1H), 7.606 (d, br, 1H).

$ZrCl_4$ (1.8197 g, 7.8085 mmol) was slurried in 50 mL of dichloromethane. The deprotanated ligand was added as a solid and washed down with 10 mL of diethyl ether, an additional 50 mL of dichloromethane was then added to the solution. The solution was stirred overnight. The mixture was filtered through Celite™, blown down, and dried under vacuum to give 2.7953 g of yellow solid, dimethylsilylene (cyclopentadienyl)(indenyl)zirconium dichloride, 78.74% 1H NMR ($CD_2Cl_2$) δ 0.940 (s, 3H), 1.138 (s, 3H), 1.865 (d, 6H), 1.913 (s, 3H), 1.925 (s, 3H), 5.986 (d, 1H), 7.030 (m, 1H), 7.171 (br, 1H), 7.303 (d, 2H), 7.65 (d, 1H).

Dimethylsilylene(cyclopentadienyl)(indenyl)zirconium dichloride (2.7659 g, 6.0840 mmol) was dissolved in 100 mL of dichloromethane. MeMgBr (5 mL of 3.0M in ether, 15 mmol) was added to the reaction via syringe. The reaction stirred overnight. The reaction was then filtered through Celite™; the solvent was removed. The product was dissolved in a toluene pentane solution and again filtered through Celite™. Recrystallization from a toluene pentane mixture to give 1.2776 g of material, 50.75% yield.

$^1$H NMR ($C_6D_6$) δ−1.341 ppm (s, 3H), −0.182 (s, 3H), 0.472 (s, 3H), 0.643 (s, 3H), 1.614 (s, 3H), 1.700 (s, 3H, 1.815 (s, 3H), 1.832 (s, 3H), 5.547 (d, 1H), 6.881 (t, 1H), 7.033 (d, 1H), 7.175 (d, 1H), 7.283 (d, 1H), 7.6 (d, 1H).

Supported Catalysts:
Montmorillonite KSF was purchased from Sigma-Aldrich. Methylalumoxane 30 wt % in toluene was purchased from Albemarle and used as received. Trimethyl aluminum, triethyl aluminum and tri-n-octyl aluminum were purchased from Akzo Nobel and used as received.

Acid Treated Montmorillonite (A-MKSF)
Montmorillonite KSF (198.766 g) was placed in a 2 L round bottom flask along with 1.40 L of $H_2O$ and 110 mL of concentrated sulfuric acid and stirred for 6 hours at 90° C.

The mixture was then allowed to stir overnight at room temperature. The mixture was filtered and the solid was washed with 4×1 L of H$_2$O. The pH of the filtrate was monitored, when the pH was approximately 3 the washing was stopped and the solid was heated to 130° C. while open to air. The solid was then placed under vacuum at RT for a few hours and then heated to 150° C. under vacuum overnight. The clay was brought into a glovebox while maintaining a nitrogen atmosphere. A 132 gram amount of tan solid was obtained.

Synthesis of Alkyl Aluminum Treated Clays

TEAL Treated A-MKSF (TEAL-A-MKSF):

Acid treated montmorillonite KSF (8.418 g) prepared above was slurried with 84 g of toluene and sonicated for 10 minutes. Triethyl aluminum (4.31 g, 37.7 mmol) was added dropwise to the slurry. The slurry was sonicated for 1 hour. $^1$H NMR analysis showed an excess of triethyl aluminum. The slurry was filtered, washed four times with 50 mL of toluene, once with pentane, and then dried under vacuum overnight to give 8.74 grams of tan solid.

TNOAL Treated A-MKSF (TNOAL-A-MKSF):

Acid Treated Montmorillonite KSF (14.8794 g) prepared above was slurried in 100 mL of toluene. The slurry was sonicated for 5 minutes. Tri-n-octylaluminum (10.2 grams, 27.9 mmol) was dissolved in 5 mL of toluene and added to the slurry. The slurry was sonicated for 1 hr 7 min. $^1$H NMR analysis shows that excess tri-n-octylaluminum was still in solution. The solid was filtered and washed three times with 50 mL of toluene and once with pentane. The solid was dried under vacuum, giving 15.5756 g of tan solid.

TMA Treated A-MKSF (TMA-A-MKSF):

Acid treated Montmorillonite KSF (43.9 g) was weighed out in a beaker and slurried in 150 mL of toluene. The mixture was sonicated for 5 min before the addition of trimethylaluminum (7.610 g, 105.6 mmol). The mixture was then sonicated for 2 hr at room temperature. $^1$H NMR analysis showed that there remained excess TMA. The mixture was filtered, washed three times with 50 mL of toluene and once with 50 mL of pentane. The solid was dried overnight. Collected 45.655 g of tan powder.

Synthesis of Supported Catalyst Systems

TNOAL Treated A-MKSF-Metallocene 2:

Tri-n-octylaluminum treated acid treated montmorillonite KSF (0.7925 g) was slurried in 20 mL of C$_6$D$_6$ and sonicated. Dimethylsilylene(2,3,4,5-tetramethyl-1-cyclopentadienyl)(3-phenyl-1-indenyl)zirconium dimethyl (15.5 mg, 0.0316 mmol) was dissolved in 5 mL of C$_6$D$_6$ and added to the slurry. 8.9 mg of toluene was added. The slurry was sonicated for 30 minutes. The solid was filtered, washed three times with 20 mL of toluene and once with pentane. The solid was dried under vacuum overnight. A 0.6473 gram amount of tan solid was obtained.

TMA Treated A-MKSF-Metallocene 2:

Trimethylaluminum treated acid treated montmorillonite KSF (0.6618 g) was slurried in 40 mL of toluene and sonicated for 4 minutes. Dimethylsilylene(2,3,4,5-tetramethyl-1-cyclopentadienyl)(3-phenyl-1-indenyl)zirconium dimethyl (13.1 mg, 0.0267 mmol) was dissolved in 5 mL of toluene and added to the slurry and sonicated for 35 minutes. The slurry was filtered and the solid was washed with 20 mL of toluene four times and once with pentane. The solid was dried under vacuum overnight. A 0.575 gram amount of tan solid was obtained.

TEAL Treated A-MKSF-Metallocene 2:

TEAL treated acid treated Montmorillonite KSF (0.6734 g) was slurried in 30 mL of toluene and sonicated for 10 min. Dimethylsilylene(2,3,4,5-tetramethyl-1-cyclopentadienyl) (3-phenyl-1-indenyl)zirconiumdimethyl (13.2 mg, 0.0269 mmol) was dissolved in 5 mL of toluene and added to the slurry. The slurry sonicated for 50 min and turned brown in color. The slurry was filtered and the solid was washed with 20 mL of toluene three times and once with pentane. The solid was dried under vacuum overnight. Collected 0.5952 g of gray/brown solid.

Catalyst 1 on Silica 948TH/MAO (Comparative):

Di methylsilyl ene(2,3,4,5-tetramethyl-1-cyclopentadienyl)(3-phenyl-1-indenyl)zirconium dichloride (22.8 mg, 0.0430 mmol) was weighed out in a vial. Methylalumoxane (0.9737 g of a 30% wt solution in toluene) was added to the vial, followed by an additional 1.7 mL of toluene. The solution is stirred for 30 min. 600° C. calcined Silica 948™ (1.0793 g) was added to the vial, add an additional 0.2 mL of toluene to help wet the material. The mixture was stirred via spatula for 10 min and then placed under vacuum overnight. 1.35 grams of orange powder was obtained.

TNOAL Treated A-MKSF Metallocene 3:

TNOAL-A-MKSF (0.8377 g) was slurried in 40 mL of toluene and sonicated for 5 min. Dimethylsilylene(cyclopentadienyl)(indenyl)zirconium dimethyl (13.7 mg, 0.0331 mmol) was dissolved in 5 mL toluene and added to the slurry. The mixture was sonicated for 30 min. The slurry was then filtered, washed with 15 mL of toluene three times, and washed twice with pentane then dried under vacuum to give 0.7191 g of brown powder.

Example 5: Slurry Polymerization with TNOAL Treated A-MKSF Metallocene 3

Figure 5A:
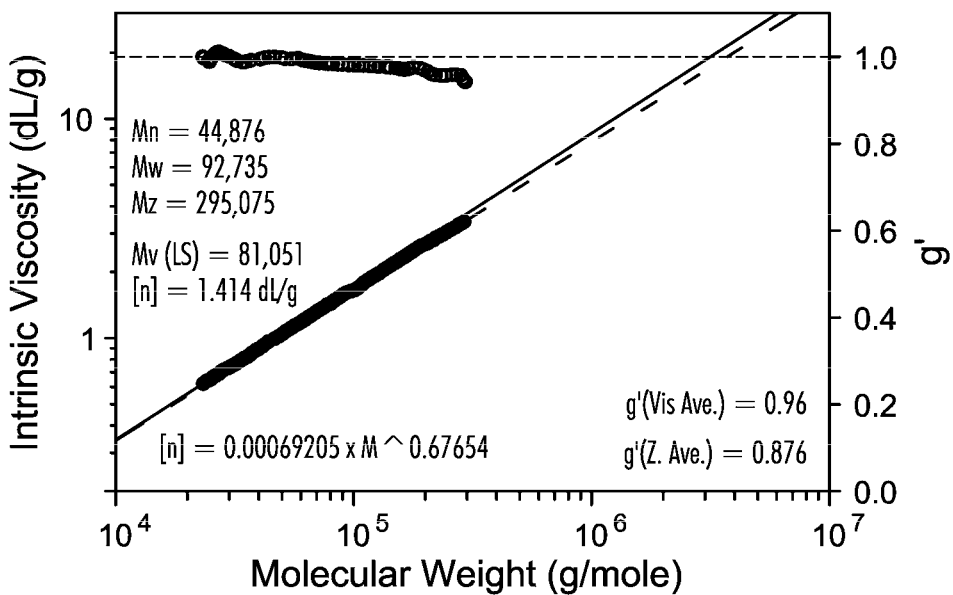
Figure 5A:
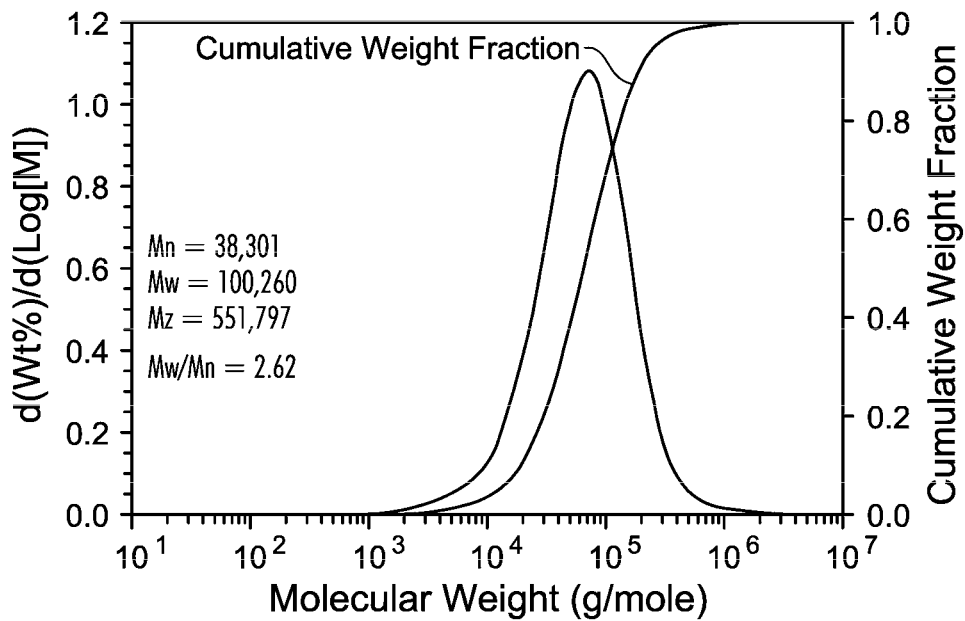

A 2 L autoclave reactor was heated to 100° C. under a constant nitrogen purge for at least 1 hr. The reactor was then cooled down to room temperature. A catalyst tube containing 2 mL of a 0.091M solution of trin-octylaluminum (TNOAL) in hexanes was added to the reactor with nitrogen. 300 mL of isohexane was added through the catalyst tube. Another catalyst tube containing 10 mL of 1-hexene was connected to the reactor. The 1-hexene was pushed in with another 300 mL of isohexane. The reactor was heated to 85° C. and stirring was set to 500 rpm. A third catalyst tube loaded with TNOAL Treated A-MKSF Metallocene 3, (60.8 mg) and 2 mL of pentane was attached to the reactor. The reactor was pressurized with 20 psi of ethylene. The catalyst was then pushed into the reactor with 200 mL of isohexane. Ethylene was placed on top of the reactor to give a total ethylene pressure of 130 psi. Stirred for 30 min. Collected 21.139 g of white powdery solid. Activity: 695 g polymer/(g cat*hr), 17876 g polymer/(mmol Zr*hr). 1-hexene wt % via $^1$H NMR: 2.04%, Mw: 100,260 g/mol, Mn: 38,301 g/mol, Mw/Mn: g'(vis ave): 0.96, g'(z ave): 0.876, 2.61, MI: 2.466 dg/min, and MIR: 19.05. GPC data are shown in FIG. 5.

Example 6: Slurry Polymerization with TNOAL Treated A-MKSF Metallocene 3

Figure 4A:
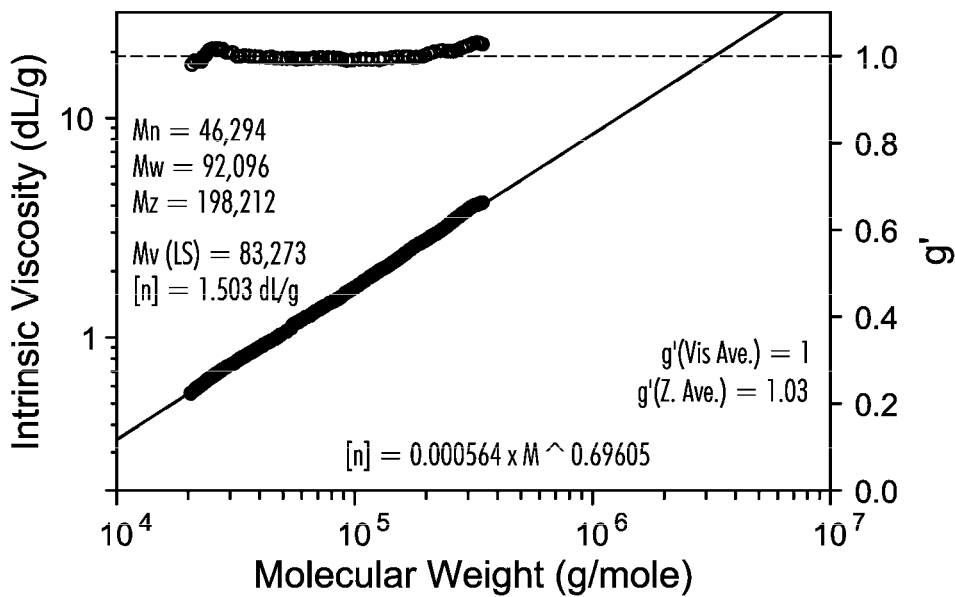
Figure 4A:
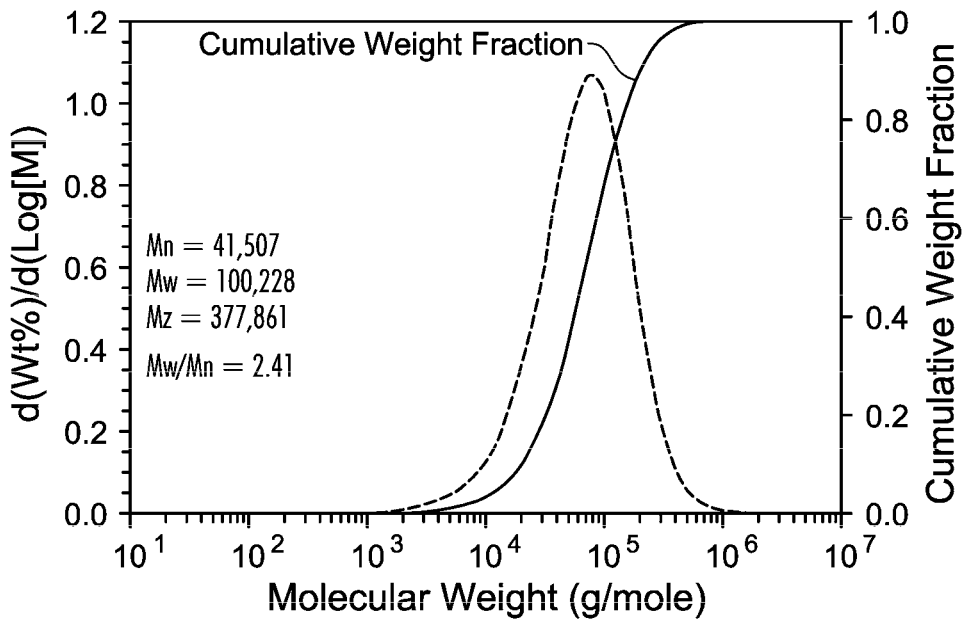

A 2 L autoclave reactor was heated to 100° C. under a constant nitrogen purge for at least 1 hr. The reactor was then cooled down to room temperature. A catalyst tube containing 2 mL of a 0.091M solution of TNOAL in hexanes was added to the reactor with nitrogen. 600 mL of isohexane was added through the catalyst tube. The reactor was heated to 85° C. and stirring was set to 500 rpm. A third catalyst tube loaded with catalyst, TNOAL Treated A-MKSF Metallocene 3 (27011-022, 54.5 mg), and 2 mL of pentane was attached to the reactor. The reactor was pressurized with 20 psi of ethylene. The catalyst was then pushed into the reactor with 200 mL of isohexane. Ethylene was placed on top of the reactor to give a total ethylene pressure of 130 psi. Stirred for 30 min. Collected 31.1 g of white powdery solid. Activity: 1142 g polymer/(g cat*hr), 29352 g polymer/(mmol Zr*hr). 1-hexene wt % via $^1$H NMR: 1.74% Mw: 100,228 g/mol, Mn: 41,507 g/mol, Mw/Mn: 2.41, g' (vis ave): 1, g'(z ave): 1.03, MI: 1.703 dg/min, and MIR: 15.47. GPC data are shown in FIG. 4.

Example 7: Slurry Polymerization with TNOAL Treated A-MKSF Metallocene 3

Figure 6A:
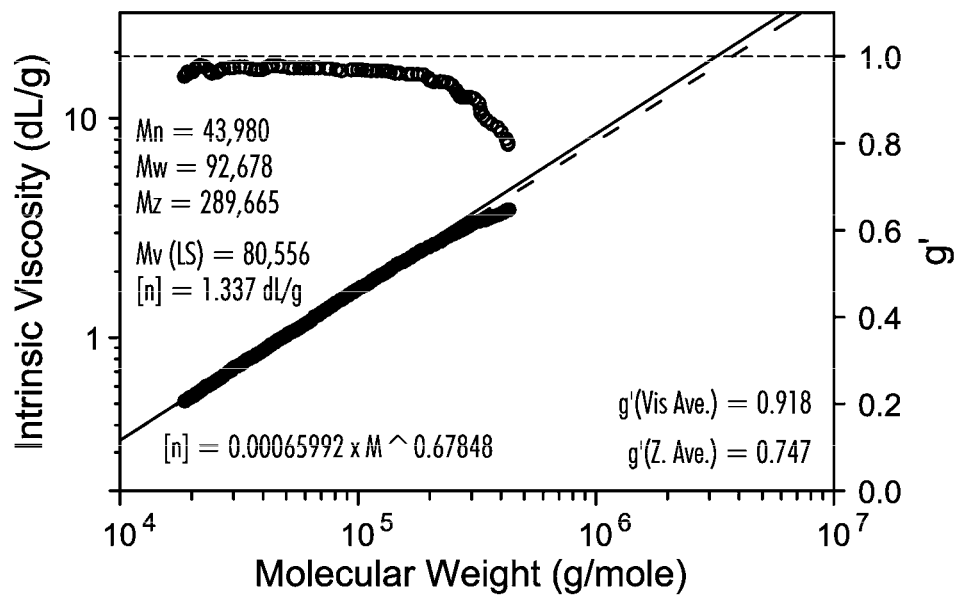
Figure 6A:
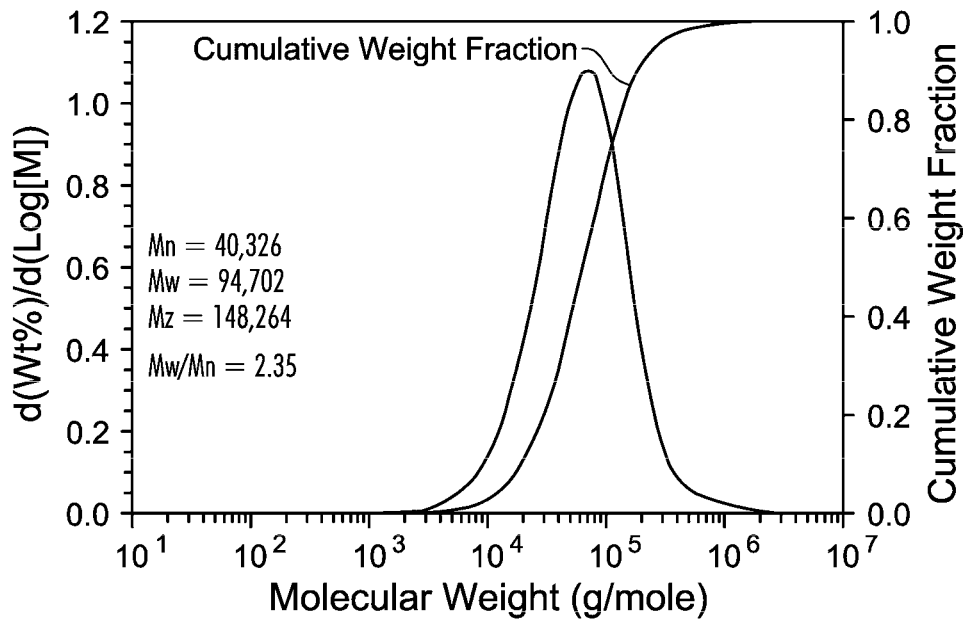

A 2 L autoclave reactor was heated to 100° C. under a constant nitrogen purge for at least 1 hr. The reactor was then cooled down to room temperature. A catalyst tube containing 2 mL of a 0.091M solution of TNOAL in hexanes was added to the reactor with nitrogen. 300 mL of isohexane was added through the catalyst tube. Another catalyst tube containing 20 mL of 1-hexene was connected to the reactor. The 1-hexene was pushed in with another 300 mL of isohexane. The reactor was heated to 85° C. and stirring was set to 500 rpm. A third catalyst tube loaded with catalyst (TNOAL Treated A-MKSF Metallocene 3, 55 mg) and 2 mL of pentane was attached to the reactor. The reactor was pressurized with 20 psi of ethylene. The catalyst was then pushed into the reactor with 200 mL of isohexane. Ethylene was placed on top of the reactor to give a total ethylene pressure of 130 psi. Stirred for 30 min. Collected 21 g of white powdery solid. Activity: 764 g polymer/(g cat*hr), 19631 g polymer/(mmol Zr*hr). 1-hexene wt % via $^1$H NMR: 2.88%, Mw: 94,702 g/mol, Mn: 40,326 g/mol, Mw/Mn: 2.35, g'(vis ave): 0.918, g'(z ave): 0.747, MI: 3.364 dg/min, and MIR: 15.10. GPC data are shown in FIG. 6.

Polymerizations in 2 L Autoclave Reactor for Metallocene 2 and Metallocene 3 Supported on Aluminum Alkyl Treated A-MSFK:

2 mL of 0.091 M TNOAL solution in hexane was added to a 2 L reactor followed by 1-hexene (if used) and isohexane. The reactor was heated to 85° C. Ethylene was pressurized into the reactor and the supported catalyst was injected with isohexane or ethylene. A constant pressure of ethylene (about 130 psi) was maintained for the allotted time before venting, removing the polymer granules. The supported catalysts were prepared as described above. The data are reported in Table 1.

TABLE 1

| Example | Support | Metallocene (mg*) | 1-hexene (ml) | Time (min) | Yield (g) | Activity gPE/g cat hr | MI (dg/min) | MIR (I21/I2) | Mw (g/mol) | Mn (g/mol) | Mw/Mn | Hexene wt % |
|---|---|---|---|---|---|---|---|---|---|---|---|---|
| a | TEAL-A-MKSF | 2 (66) | 0 | 10 | 39.875 | 3770 | 32.48 | 25.23 | 73335 | 19922 | 3.68 | — |
| b | TEAL-A-MKSF | 2 (25.4) | 10 | 40 | 32.029 | 1880 | 2.002 | 29.64 | 89892 | 31333 | 2.87 | 2.7 |
| c | TNOAL-A-MKSF | 2 (47.2) | 0 | 15 | 31.678 | 2680 | 35.58 | 23.26 | 52393 | 9182 | 5.71 | — |
| d | TMA-A-MKSF | 2 (50.6) | 0 | 15 | 61.880 | 4420 | 4.589 | 28.55 | 80039 | 20935 | 3.82 | — |
| e | TEAL-A-MKSF | 2 (44.6) | 20 | 20 | 54.779 | 3720 | 5.7 | 23.87 | 70371 | 31218 | 2.25 | 3.3 |
| f | TEAL-A-MKSF | 2 (43.5) | 30 | 40 | 61.379 | 2106 | 5.989 | 24.81 | 69980 | 27050 | 2.59 | 4.3 |
| g | TMA-A-MKSF | 2 (65.8) | 0 | 20 | 101.25 | 4610 | 3.369 | 31.37 | 93214 | 22738 | 4.1 | — |
| h | TNOAL-A-MKSF | 2 (55.3) | 30 | 60 | 79.430 | 1440 | 9.105 | 24.31 | | | | 5.8 |
| i | TNOAL-A-MKSF | 3 (60.8) | 10 | 30 | 21.1 | 695 | 2.47 | 19.0 | | | | 2.0 |
| j | TNOAL-A-MKSF | 3 (54.5) | 0 | 30 | 31.1 | 1140 | 1.7 | 15.5 | | | | 1.74 |
| k | TNOAL-A-MKSF | 3 (55) | 20 | 30 | 21 | 764 | 3.36 | 15.1 | | | | 2.88 |

*the weight of the supported catalyst system

Example A: Preparation of Supported Catalyst A: Metallocene 2 (Dimethylsilylene(2,3,4,5-tetramethyl-1-cyclopentadienyl)(3-phenyl-1-indenyl)zirconium dimethyl) Supported on TEAL Treated Montmorillonite for Use in Gas Phase Polymerization Acid treated Montmorillonite KSF (43.9 g) was weighed out in a beaker and slurried in 150 mL of toluene. The mixture was sonicated for 5 min before the addition of trimethylaluminum (7.610 g, 105.6 mmol). The mixture was then sonicated for 2 hr at room temperature. $^1$H NMR analysis showed that there remained excess TMA. The mixture was filtered, washed three times with 50 mL of toluene and once with 50 mL of pentane. The solid was dried overnight. Collected 45.655 g of tan powder. The trimethylaluminum treated A-MKSF (45.594 g) was then slurried in 200 mL of toluene and sonicated for 13 min. Dimethylsilylene(2,3,4,5-tetramethyl-1-cyclopentadienyl)(3-phenyl-1-indenyl)zirconium dimethyl (0.895 mg, 1.83 mmol) was dissolved in 17 mL of toluene and added to the slurry and sonicated for 1 hour. The slurry was filtered and the solid was washed with 100 mL of toluene three times and once with pentane. The solid was dried under vacuum overnight. A 45.7 gram amount of tan solid was obtained.

Example B: Preparation of Supported Catalyst B: Metallocene 1 on Silica Support for Use in Gas Phase Polymerization (Comparative)

MAO (38.6326 g of a 30% wt methylalumoxane/toluene solution) was added to a 250 mL round bottom flask along with 45 mL of toluene and stirred for 15 min. Metallocene 1 (0.4032 g, 0.7597 mmol) was added to the round bottom with 10 mL of toluene and stirred for 30 min. Silica 948™ (37.9850 g), calcined at 600° C., was added to the round bottom and washed down with another 25 mL of toluene. The mixture was stirred via spatula for 10 min before being placed under vacuum for 2 days. Collected 50.4879 g of pink solid.

Example C: Gas Phase Polymerization

Polymerization was performed in a gas phase fluidized bed reactor with a 6 inch body and a 10 inch expanded section at the top. Cycle and feed gases were fed through a perforated distributor plate that dispersed the gas and kept the bed in place. Reactor temperature was maintained by heating the cycle gas, and the reactor was vented as necessary to maintain the desired ethylene composition. Compositions of all listed gases were monitored by gas chromatograph. A catalyst suspension of 10 wt % solids in mineral oil was fed continuously throughout the run, and products were collected from the reactor as necessary to maintain the desired bed weight. the data are reported in Table 2.

TABLE 2

| Sample | Supported Catalyst A | Supported Catalyst B (Comparative) |
|---|---|---|
| Temperature (° C.) | 85 | 85 |
| Pressure (psi) | 300 | 300 |
| Ethylene (mol %) | 70 | 70 |
| Hydrogen (ppm) | 70 | 330 |
| Hexene (mol %) | 1.96 | 2.1 |
| Bed Weight (g) | 2000 | 2000 |
| Residence Time (hr) | 8.8 | 3.9 |
| Cycle Gas Velocity (ft/s) | 1.4 | 1.4 |
| Production Rate (g/hr) | 227 | 509 |
| Activity ($g_{poly}/g_{supported\ cat}$) | 580 | 2089 |
| Density (g/cm$^3$) | 0.9235 | 0.9194 |
| MI (g/10 min) | 1.12 | 0.98 |
| HLMI/MI Ratio (MIR) | | 50.95 |
| Bulk Density (g/cc) | 0.3347 | 0.2869 |

All documents described herein are incorporated by reference herein, including any priority documents and/or testing procedures to the extent they are not inconsistent with this text. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including." Likewise whenever a composition, an element or a group of elements is preceded with the transitional phrase "comprising", it is understood that we also contemplate the same composition or group of elements with transitional phrases "consisting essentially of," "consisting of", "selected from the group consisting of," or "is" preceding the recitation of the composition, element, or elements and vice versa.

What is claimed is:

1. A process to polymerize olefins comprising:
   i) contacting one or more olefins with a catalyst system comprising: 1) optionally, an activator, 2) an organoaluminum treated layered silicate support, and 3) bridged metallocene compound represented by the formula:

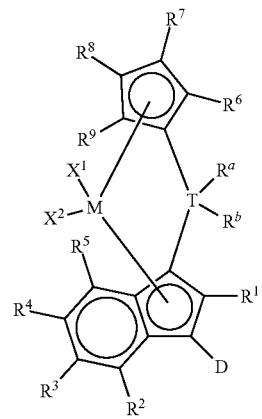

wherein:
M is a group 4 metal;
T is a group 14 atom;
D is a hydrogen, halide, alkoxide or a $C_1$ to $C_{40}$ substituted or unsubstituted hydrocarbyl group;
$R^a$ and $R^b$ are independently, hydrogen, halogen, or a $C_1$ to $C_{20}$ substituted or unsubstituted hydrocarbyl, and $R^a$ and $R^b$ can form a cyclic structure including substituted or unsubstituted aromatic, partially saturated, or saturated cyclic or fused ring system;
each $X^1$ and $X^2$ is independently selected from the group consisting of $C_1$ to $C_{20}$ substituted or unsubstituted hydrocarbyl groups, hydrides, amides, amines, alkoxides, sulfides, phosphides, halides, dienes, phosphines, and ethers; and $X^1$ and $X^2$ can form a cyclic structure including aromatic, partially saturated, or saturated cyclic or fused ring system;
each of $R^1$, $R^2$, $R^3$, $R^4$, and $R^5$ is, independently, hydrogen, halide, alkoxide or a $C_1$ to $C_{40}$ substituted or unsubstituted hydrocarbyl group, and any of adjacent $R^2$, $R^3$, $R^4$, and/or $R^5$ groups may form a fused ring or multicenter fused ring systems, where the rings may be substituted or unsubstituted, and may be aromatic, partially unsaturated, or unsaturated; and
each of $R^6$, $R^7$, $R^8$, and $R^9$ is, each independently, hydrogen or a $C_1$ to $C_{40}$ substituted or unsubstituted hydrocarbyl group;
ii) obtaining polyolefin having a g'(vis) of 0.90 or more and an MIR of 30 or less.

2. The process of claim 1, wherein M is zirconium or hafnium.

3. The process of claim 1, wherein D is a substituted or unsubstituted aromatic group at least two of $R^6$, $R^7$, $R^8$, and $R^9$ are $C_1$ to $C_{40}$ substituted or unsubstituted hydrocarbyl groups.

4. The process of claim 1, wherein D is selected from the group consisting of substituted or unsubstituted phenyl, naphthyl, biphenyl, cyclopropentyl, tropylium, cyclooctatetraenyl, furanyl, pyridinyl, borabenzyl, thiophenyl, azolyl, oxazolyl, and imidazolyl.

5. The process of claim 1, wherein T is silicon or germanium.

6. The process of claim 1, wherein each $R^a$ and $R^b$ is independently selected from the group consisting of halides, $C_1$ to $C_{20}$ substituted or unsubstituted hydrocarbyl groups, and cyclic structures where $R^a$ and $R^b$ form a heterocyclopentyl, heterocyclobutyl, or heterocyclohexyl structure with T being the heteroatom.

7. The process of claim 1, wherein each $X^1$ and $X^2$ is independently selected from the group consisting of halides and $C_1$ to $C_{20}$ substituted or unsubstituted hydrocarbyl groups.

8. The process of claim 1, wherein each of $R^1$, $R^2$, $R^3$, $R^4$, $R^5$, $R^6$, $R^7$, $R^8$, and $R^9$ is, independently, hydrogen or a $C_1$ to $C_{20}$ substituted or unsubstituted hydrocarbyl group.

9. The process of claim 1, wherein each of $R^6$, $R^7$, $R^8$, and $R^9$ is, independently, a $C_1$ to $C_{40}$ substituted or unsubstituted hydrocarbyl group.

10. The process of claim 8, wherein $R^6$ and $R^9$ are the same.

11. The process of claim 8, wherein $R^7$ and $R^8$ are the same.

12. The process of claim 1, wherein each of $R^6$, $R^7$, $R^8$, and $R^9$ is, independently, selected from the group consisting of methyl, ethyl, propyl, isopropyl, n-butyl, sec-butyl, t-butyl, pentyl, hexyl, heptyl, octyl, decyl, and undecyl groups.

13. The process of claim 1, wherein each of $R^6$, $R^7$, $R^8$, and $R^9$ is, independently, a methyl group, an ethyl group, or an n-propyl group.

14. The process of claim 1, wherein adjacent $R^6$, $R^7$, $R^8$, and/or $R^9$ groups fuse together with the cyclopentadienyl group to form a substituted or unsubstituted fluorene.

15. The process of claim 1, wherein the organoaluminum compound is represented by the formula:

$AlR_3$ or $AlR^*_n Y_{3-n}$ wherein each R is independently a substituted or unsubstituted alkyl group and/or a substituted or unsubstituted aryl group, R* is a hydrocarbon group having a carbon number of from 1 to 30, Y is hydrogen, halogen, an alkoxy group or a siloxy group, and n is 1, 2, or 3.

16. The process of claim 1, wherein the organoaluminum compound comprises trimethylaluminum, triethylaluminum, triisobutylaluminum, tri-n-hexylaluminum, tri-n-octylaluminum, tri-iso-octylaluminum, triphenylaluminum, or combinations thereof.

17. The process of claim 1, wherein the organoaluminum compound comprises 0 to 20 wt % alkyl alumoxane, based upon the weight of the organoaluminum compounds on the support.

18. The process of claim 1, wherein the organoaluminum compound comprises 0 wt % alkyl alumoxane.

19. The process of claim 1, wherein the support is treated with triethylaluminum, triisobutylaluminum, trimethylaluminum, tri-n-octylaluminum.

20. The process of claim 1, wherein the support comprises montmorillonite, nontronite, beidellite, volkonskoite, laponite, hectorite, saponite, sauconite, stevensite, vermiculite, halloysite, aluminate oxides, bentonite, kaolinite, dickite, smectic clays, mica, magadiite, kenyaite, octosilicate, kanemite, makatite, attapulgite, sepiolite, zeolitic layered materials, and mixtures thereof.

21. The process of claim 1, wherein the support is acidified by contacting with an acid prior to treatment with the organoaluminum compound.

22. The process of claim 1, wherein the support is contacted with a Bronsted acid prior to treatment with the organoaluminum compound.

23. The process of claim 1, wherein the support is montmorillonite.

24. The process of claim 1, wherein the polyolefin is an ethylene polymer.

25. The process of claim 1, wherein the polyolefin is an ethylene polymer having a bimodal composition distribution and a g'vis of 0.95 or more.

26. The process of claim 1, wherein the polyolefin has a bimodal Mw/Mn, a bimodal composition distribution and a g'vis of 0.95 or more.

27. The process of claim 1, wherein the polymerization is conducted in the gas phase.

28. The process of claim 1, wherein the polymerization is conducted in the slurry phase.

29. The process of claim 1, wherein the polyolefin has:
1) an Mw of 25,000 to 1,000,000 g/mol;
2) an Mw/Mn of from 1 to 10;
3) an MI of 0.1 dg/min or more;
4) a bimodal composition distribution; and
5) a g'(z ave) of 0.50 or more.

30. The process of claim 1 wherein the organoaluminum compound is present at from 0.01 to 1000 mmol per 1 g of support.

* * * * *